US012243456B2

(12) United States Patent
Pyun et al.

(10) Patent No.: US 12,243,456 B2
(45) **Date of Patent: *Mar. 4, 2025**

(54) ORGANIC LIGHT-EMITTING DIODE DISPLAY DEVICE PERFORMING A SENSING OPERATION, AND METHOD OF SENSING DEGRADATION OF AN ORGANIC LIGHT-EMITTING DIODE DISPLAY DEVICE

(71) Applicant: SAMSUNG DISPLAY CO., LTD., Yongin-si (KR)

(72) Inventors: Kihyun Pyun, Gwangmyeong-si (KR); Siduk Sung, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/059,721

(22) Filed: Nov. 29, 2022

(65) Prior Publication Data

US 2023/0110937 A1 Apr. 13, 2023

Related U.S. Application Data

(63) Continuation of application No. 17/211,370, filed on Mar. 24, 2021, now Pat. No. 11,551,593.

(30) Foreign Application Priority Data

Jul. 9, 2020 (KR) ........................ 10-2020-0084743

(51) Int. Cl.

| | |
|---|---|
| ***G09G 3/32*** | (2016.01) |
| ***G09G 3/00*** | (2006.01) |
| ***G09G 3/3283*** | (2016.01) |

(52) U.S. Cl.
CPC ........... *G09G 3/006* (2013.01); *G09G 3/3283* (2013.01); *G09G 2310/061* (2013.01); *G09G 2320/048* (2013.01); *G09G 2330/027* (2013.01)

(58) Field of Classification Search
CPC ................. G09G 3/006; G09G 3/3283; G09G 2310/061; G09G 2320/048; G09G 2330/027
See application file for complete search history.

(56) References Cited

U.S. PATENT DOCUMENTS 9,875,687 B2 1/2018 Han et al.
2016/0307498 A1* 10/2016 Chaji .................. G09G 3/3291
(Continued)

FOREIGN PATENT DOCUMENTS

KR 10-0186402 12/1998
KR 1020160081421 7/2016
(Continued)

OTHER PUBLICATIONS

Office Action dated Mar. 3, 2022 in corresponding U.S. Appl. No. 17/211,370.
(Continued)

*Primary Examiner* — Michael A Faragalla
(74) *Attorney, Agent, or Firm* — F. Chau & Associates, LLC

(57) ABSTRACT

An organic light-emitting diode (OLED) display device includes a display panel including a plurality of pixels, the plurality of pixels being grouped into a plurality of pixel blocks, a nonvolatile memory configured to store previous accumulated block degradation information for the plurality of pixel blocks up to a previous driving period, a controller configured to calculate current block degradation information for the plurality of pixel blocks in a current driving
(Continued)

period, to calculate current accumulated block degradation information for the plurality of pixel blocks up to the current driving period by adding the current block degradation information to the previous accumulated block degradation information in response to a power control signal indicating a power-off, and to determine whether a sensing operation for each of the plurality of pixel blocks is to be performed by comparing the current accumulated block degradation information for each of the plurality of pixel blocks with a sensing reference degradation amount, and a sensing circuit configured to selectively perform the sensing operation for each of the plurality of pixel blocks.

20 Claims, 12 Drawing Sheets

(56) References Cited

U.S. PATENT DOCUMENTS

| | | | | |
|---|---|---|---|---|
| 2016/0379551 | A1* | 12/2016 | Zhuang | G09G 3/3208 345/520 |
| 2017/0249051 | A1* | 8/2017 | Uehara | G06F 3/0443 |
| 2018/0247588 | A1* | 8/2018 | Lee | G09G 3/3225 |
| 2018/0336827 | A1* | 11/2018 | Zahirovic | H04N 5/57 |
| 2022/0013049 | A1 | 1/2022 | Pyun et al. | |

FOREIGN PATENT DOCUMENTS

| | | |
|---|---|---|
| KR | 1020160081426 | 7/2016 |
| KR | 1020170122432 | 11/2017 |
| KR | 1020170132016 | 12/2017 |
| KR | 10-2016-0041132 | 6/2021 |

OTHER PUBLICATIONS

Final Office Action dated Jun. 13, 2022 in corresponding U.S. Appl. No. 17/211,370.

Notice of Allowance dated Sep. 23, 2024 in corresponding KR Appln No. 10-2020-0084743.

* cited by examiner

ORGANIC LIGHT-EMITTING DIODE DISPLAY DEVICE PERFORMING A SENSING OPERATION, AND METHOD OF SENSING DEGRADATION OF AN ORGANIC LIGHT-EMITTING DIODE DISPLAY DEVICE

CROSS-REFERENCE TO RELATED APPLICATION(S)

This U.S. non-provisional patent application is a continuation of co-pending U.S. patent application Ser. No. 17/211,370, titled ORGANIC LIGHT-EMITTING DIODE DISPLAY DEVICE PERFORMING A SENSING OPERATION, AND METHOD OF SENSING DEGRADATION OF AN ORGANIC LIGHT-EMITTING DIODE DISPLAY DEVICE, and filed on Mar. 24, 2021, which in turn, claims priority under 35 USC § 119 to Korean Patent Application No. 10-2020-0084743, filed on Jul. 9, 2020 in the Korean Intellectual Property Office (KIPO), the entire disclosures of which are incorporated by reference.

FIELD

Embodiments of the present inventive concept relate to a display device, and more particularly to an organic light-emitting diode (OLED) display device performing a sensing operation, and a method of sensing degradation of an OLED display device.

DISCUSSION OF RELATED ART

As an organic light-emitting diode (OLED) display device operates over time, driving transistors and/or OLEDs forming a plurality of pixels included in the OLED display device may degrade. To compensate for such degradation of the driving transistors and/or OLEDs, the OLED display device may perform a sensing operation that senses characteristics of the driving transistors and/or OLEDs forming the plurality of pixels. When a related art OLED display device performs a sensing operation for entire pixels included in the related art OLED display device, it may take a relatively long sensing time to perform the sensing operation.

SUMMARY

Some embodiments provide an organic light-emitting diode (OLED) display device capable of relatively short sensing time.

Some embodiments provide a method of sensing degradation of an OLED display device within a relatively short sensing time.

According to an embodiment, an OLED display device includes a display panel having a plurality of pixels, the plurality of pixels being grouped into a plurality of pixel blocks, a nonvolatile memory configured to store previous accumulated block degradation information for the plurality of pixel blocks up to a previous driving period, a controller configured to calculate current block degradation information for the plurality of pixel blocks in a current driving period, calculate current accumulated block degradation information for the plurality of pixel blocks up to the current driving period by adding the current block degradation information to the previous accumulated block degradation information in response to a power control signal indicating a power-off, and determine whether a sensing operation for each of the plurality of pixel blocks is to be performed by comparing the current accumulated block degradation information for each of the plurality of pixel blocks with a sensing reference degradation amount, and a sensing circuit configured to selectively perform the sensing operation for each of the plurality of pixel blocks.

In an embodiment, the controller may divide input image data into a plurality of block image data for the plurality of pixel blocks, and may calculate the current block degradation information for the plurality of pixel blocks in the current driving period by accumulating the plurality of block image data in each of a plurality of frame periods.

In an embodiment, the controller may calculate the current block degradation information in the current driving period by applying at least one of block position weights determined according to positions of the plurality of pixel blocks, driving frequency weights determined according to driving frequencies of the plurality of pixel blocks, emission duty weights determined according to emission duties of the plurality of pixel blocks, or a global current modulation compensation value for the display panel to the plurality of block image data.

In an embodiment, the controller may read the previous accumulated block degradation information from the nonvolatile memory in response to the power control signal indicating a power-on.

In an embodiment, the controller may write the current accumulated block degradation information to the nonvolatile memory in response to the power control signal indicating the power-off where the current accumulated block degradation information in the current driving period is used as the previous accumulated block degradation information in a next driving period.

In an embodiment, the controller may determine that the sensing operation for a pixel block of the plurality of pixel blocks is not to be performed in a first case where the current accumulated block degradation information for the pixel block is less than the sensing reference degradation amount, and may determine that the sensing operation for the pixel block is to be performed in a second case where the current accumulated block degradation information for the pixel block is greater than or equal to the sensing reference degradation amount.

In an embodiment, the controller may reset the current accumulated block degradation information for the pixel block for which the sensing operation is determined to be performed to an initial degradation amount where the previous accumulated block degradation information for the pixel block for which the sensing operation is determined to be performed in a next driving period indicates the initial degradation amount.

In an embodiment, the nonvolatile memory may further store previous final accumulated block degradation information for the plurality of pixel blocks from an initial driving period up to the previous driving period. The controller may calculate current final accumulated block degradation information for the plurality of pixel blocks from the initial driving period up to the current driving period by adding the current block degradation information to the previous final accumulated block degradation information in response to the power control signal indicating the power-off.

In an embodiment, the controller may include an age manager configured to determine whether the sensing operation for each of the plurality of pixel blocks is to be performed. The age manager may include a previous degradation storage block configured to store the previous accumulated block degradation information read from the nonvolatile memory, a previous final degradation storage block configured to store previous final accumulated block degradation information read from the nonvolatile memory, a current degradation calculation block configured to calculate the current block degradation information in the current driving period, a degradation addition block configured to calculate the current accumulated block degradation information by adding the current block degradation information to the previous accumulated block degradation information, a final degradation addition block configured to calculate the current final accumulated block degradation information by adding the current block degradation information to the previous final accumulated block degradation information, a current degradation storage block configured to store the current accumulated block degradation information, a current final degradation storage block configured to store the current final accumulated block degradation information, a sensing reference storage block configured to store the sensing reference degradation amount, and a degradation sensing comparator configured to compare the current accumulated block degradation information with the sensing reference degradation amount to determine whether the sensing operation for each of the plurality of pixel blocks is to be performed, and to reset the current accumulated block degradation information that is stored in the current degradation storage block and is greater than or equal to the sensing reference degradation amount.

In an embodiment, the sensing operation for each of the plurality of pixel blocks may include a transistor sensing operation for driving transistors of the plurality of pixels included in each of the plurality of pixel blocks, and a diode sensing operation for organic light-emitting diodes of the plurality of pixels included in each of the plurality of pixel blocks.

In an embodiment, the previous accumulated block degradation information may include previous accumulated block transistor degradation information for driving transistors of the plurality of pixels included in the plurality of pixel blocks, and previous accumulated block diode degradation information for organic light-emitting diodes of the plurality of pixels included in the plurality of pixel blocks.

In an embodiment, the controller may calculate current accumulated block transistor degradation information for the plurality of pixel blocks by adding the current block degradation information to the previous accumulated block transistor degradation information in response to the power control signal indicating the power-off, and may calculate current accumulated block diode degradation information for the plurality of pixel blocks by adding the current block degradation information to the previous accumulated block diode degradation information in response to the power control signal indicating the power-off.

In an embodiment, the sensing reference degradation amount may include a transistor sensing reference degradation amount and a diode sensing reference degradation amount. The sensing operation may include a transistor sensing operation and a diode sensing operation. The controller may determine whether the transistor sensing operation for each of the plurality of pixel blocks is to be performed by comparing the current accumulated block transistor degradation information with the transistor sensing reference degradation amount, and may determine whether the diode sensing operation for each of the plurality of pixel blocks is to be performed by comparing the current accumulated block diode degradation information with the diode sensing reference degradation amount.

In an embodiment, the controller may include an age manager configured to determine whether the transistor sensing operation for each of the plurality of pixel blocks is to be performed and whether the diode sensing operation for each of the plurality of pixel blocks is to be performed. The age manager may include a previous transistor degradation storage block configured to store the previous accumulated block transistor degradation information read from the nonvolatile memory, a previous diode degradation storage block configured to store the previous accumulated block diode degradation information read from the nonvolatile memory, a previous final degradation storage block configured to store previous final accumulated block degradation information read from the nonvolatile memory, a current degradation calculation block configured to calculate the current block degradation information in the current driving period, a transistor degradation addition block configured to calculate the current accumulated block transistor degradation information by adding the current block degradation information to the previous accumulated block transistor degradation information, a diode degradation addition block configured to calculate the current accumulated block diode degradation information by adding the current block degradation information to the previous accumulated block diode degradation information, a final degradation addition block configured to calculate the current final accumulated block degradation information by adding the current block degradation information to the previous final accumulated block degradation information, a current transistor degradation storage block configured to store the current accumulated block transistor degradation information, a current diode degradation storage block configured to store the current accumulated block diode degradation information, a current final degradation storage block configured to store the current final accumulated block degradation information, a transistor sensing reference storage block configured to store the transistor sensing reference degradation amount, a diode sensing reference storage block configured to store the diode sensing reference degradation amount, a transistor degradation sensing comparator configured to compare the current accumulated block transistor degradation information with the transistor sensing reference degradation amount to determine whether the transistor sensing operation for each of the plurality of pixel blocks is to be performed, and to reset the current accumulated block transistor degradation information that is stored in the current transistor degradation storage block and is greater than or equal to the transistor sensing reference degradation amount, and a diode degradation sensing comparator configured to compare the current accumulated block diode degradation information with the diode sensing reference degradation amount to determine whether the diode sensing operation for each of the plurality of pixel blocks is to be performed, and to reset the current accumulated block diode degradation information that is stored in the current diode degradation storage block and is greater than or equal to the diode sensing reference degradation amount.

According to an embodiment, an OLED display device includes a display panel having a plurality of pixels, the plurality of pixels being grouped into a plurality of pixel blocks, a nonvolatile memory configured to store previous accumulated block transistor degradation information for the plurality of pixel blocks up to a previous driving period, previous accumulated block diode degradation information for the plurality of pixel blocks up to the previous driving period, and previous final accumulated block degradation information for the plurality of pixel blocks from an initial driving period up to the previous driving period, a controller configured to calculate current block degradation information for the plurality of pixel blocks in a current driving period, to calculate current accumulated block transistor degradation information for the plurality of pixel blocks by adding the current block degradation information to the previous accumulated block transistor degradation information in response to a power control signal indicating a power-off, to calculate current accumulated block diode degradation information for the plurality of pixel blocks by adding the current block degradation information to the previous accumulated block diode degradation information in response to the power control signal indicating the power-off, to calculate current final accumulated block degradation information for the plurality of pixel blocks by adding the current block degradation information to the previous final accumulated block degradation information in response to the power control signal indicating the power-off, to determine whether a transistor sensing operation for each of the plurality of pixel blocks is to be performed by comparing the current accumulated block transistor degradation information with a transistor sensing reference degradation amount, and to determine whether a diode sensing operation for each of the plurality of pixel blocks is to be performed by comparing the current accumulated block diode degradation information with a diode sensing reference degradation amount, and a sensing circuit configured to selectively perform the transistor sensing operation for each of the plurality of pixel blocks, and to selectively perform the diode sensing operation for each of the plurality of pixel blocks.

In an embodiment, the controller may include an age manager configured to determine whether the transistor sensing operation for each of the plurality of pixel blocks is to be performed and whether the diode sensing operation for each of the plurality of pixel blocks is to be performed. The age manager may include a previous transistor degradation storage block configured to store the previous accumulated block transistor degradation information read from the nonvolatile memory, a previous diode degradation storage block configured to store the previous accumulated block diode degradation information read from the nonvolatile memory, a previous final degradation storage block configured to store previous final accumulated block degradation information read from the nonvolatile memory, a current degradation calculation block configured to calculate the current block degradation information in the current driving period, a transistor degradation addition block configured to calculate the current accumulated block transistor degradation information by adding the current block degradation information to the previous accumulated block transistor degradation information, a diode degradation addition block configured to calculate the current accumulated block diode degradation information by adding the current block degradation information to the previous accumulated block diode degradation information, a final degradation addition block configured to calculate the current final accumulated block degradation information by adding the current block degradation information to the previous final accumulated block degradation information, a current transistor degradation storage block configured to store the current accumulated block transistor degradation information, a current diode degradation storage block configured to store the current accumulated block diode degradation information, a current final degradation storage block configured to store the current final accumulated block degradation information, a transistor sensing reference storage block configured to store the transistor sensing reference degradation amount, a diode sensing reference storage block configured to store the diode sensing reference degradation amount, a transistor degradation sensing comparator configured to compare the current accumulated block transistor degradation information with the transistor sensing reference degradation amount to determine whether the transistor sensing operation for each of the plurality of pixel blocks is to be performed, and to reset the current accumulated block transistor degradation information that is stored in the current transistor degradation storage block and is greater than or equal to the transistor sensing reference degradation amount, and a diode degradation sensing comparator configured to compare the current accumulated block diode degradation information with the diode sensing reference degradation amount to determine whether the diode sensing operation for each of the plurality of pixel blocks is to be performed, and to reset the current accumulated block diode degradation information that is stored in the current diode degradation storage block and is greater than or equal to the diode sensing reference degradation amount.

According to an embodiment, a method of sensing degradation of an OLED display device is provided. In the method, previous accumulated block degradation information for the plurality of pixel blocks up to a previous driving period is read from a nonvolatile memory included in the OLED display device, current block degradation information for the plurality of pixel blocks in a current driving period is calculated, current accumulated block degradation information for the plurality of pixel blocks up to the current driving period is calculated by adding the current block degradation information to the previous accumulated block degradation information in response to a power control signal indicating a power-off, whether a sensing operation for each of the plurality of pixel blocks is to be performed is determined by comparing the current accumulated block degradation information for each of the plurality of pixel blocks with a sensing reference degradation amount, and the sensing operation for each of the plurality of pixel blocks is selectively performed.

In an embodiment, to determine whether the sensing operation for each of the plurality of pixel blocks is to be performed, it may be determined that the sensing operation for a pixel block of the plurality of pixel blocks is not to be performed in a first case where the current accumulated block degradation information for the pixel block is less than the sensing reference degradation amount, it may be determined that the sensing operation for the pixel block is to be performed in a second case where the current accumulated block degradation information for the pixel block is greater than or equal to the sensing reference degradation amount, and the current accumulated block degradation information for the pixel block for which the sensing operation is determined to be performed may be reset to an initial degradation amount.

In an embodiment, previous final accumulated block degradation information for the plurality of pixel blocks from an initial driving period up to the previous driving period may be read from the nonvolatile memory, and current final accumulated block degradation information for the plurality of pixel blocks from the initial driving period up to the current driving period may be calculated by adding the current block degradation information to the previous final accumulated block degradation information in response to the power control signal indicating the power-off.

In an embodiment, to read the previous accumulated block degradation information from the nonvolatile memory, previous accumulated block transistor degradation information for driving transistors of the plurality of pixels included in the plurality of pixel blocks may be read from the nonvolatile memory, and previous accumulated block diode degradation information for organic light-emitting diodes of the plurality of pixels included in the plurality of pixel blocks may be read from the nonvolatile memory. To calculate the current accumulated block degradation information, current accumulated block transistor degradation information for the plurality of pixel blocks may be calculated by adding the current block degradation information to the previous accumulated block transistor degradation information, and current accumulated block diode degradation information for the plurality of pixel blocks may be calculated by adding the current block degradation information to the previous accumulated block diode degradation information. To determine whether the sensing operation for each of the plurality of pixel blocks is to be performed, whether a transistor sensing operation for each of the plurality of pixel blocks is to be performed may be determined by comparing the current accumulated block transistor degradation information with a transistor sensing reference degradation amount, and whether a diode sensing operation for each of the plurality of pixel blocks is to be performed may be determined by comparing the current accumulated block diode degradation information with a diode sensing reference degradation amount.

As described above, in an OLED display device and a method of sensing degradation of the OLED display device according to an embodiment, current accumulated block degradation information for a plurality of pixel blocks may be calculated by adding current block degradation information to previous accumulated block degradation information, and whether a sensing operation for each of the plurality of pixel blocks is to be performed may be determined by comparing the current accumulated block degradation information for each of the plurality of pixel blocks with a sensing reference degradation amount. Accordingly, the sensing operation for each of the plurality of pixel blocks may be selectively performed, and thus a sensing time in which the sensing operation is performed may be decreased compared with a case where the sensing operation is performed on each of the entire pixels.

Further, in the OLED display device and the method of sensing degradation of the OLED display device according to an embodiment, current accumulated block transistor degradation information for a plurality of pixel blocks may be calculated by adding current block degradation information to previous accumulated block transistor degradation information, current accumulated block diode degradation information for the plurality of pixel blocks may be calculated by adding the current block degradation information to previous accumulated block diode degradation information, whether a transistor sensing operation for each of the plurality of pixel blocks is to be performed may be determined by comparing the current accumulated block transistor degradation information for each of the plurality of pixel blocks with a transistor sensing reference degradation amount, and whether a diode sensing operation for each of the plurality of pixel blocks is to be performed may be determined by comparing the current accumulated block diode degradation information for each of the plurality of pixel blocks with a diode sensing reference degradation amount. Accordingly, the transistor sensing operation for each of the plurality of pixel blocks may be selectively performed, the diode sensing operation for each of the plurality of pixel blocks may be selectively performed, and thus a sensing time in which the transistor sensing operation and/or the diode sensing operation are performed may be decreased compared with a case where the transistor sensing operation and the diode sensing operation are performed on each of the entire pixels.

BRIEF DESCRIPTION OF THE DRAWINGS

Illustrative, non-limiting embodiments may be more clearly understood from the following detailed description when taken in conjunction with the accompanying drawings, in which.

DETAILED DESCRIPTION

Hereinafter, embodiments of the present inventive concept will be explained in detail with reference to the accompanying drawings.

Figure 1:
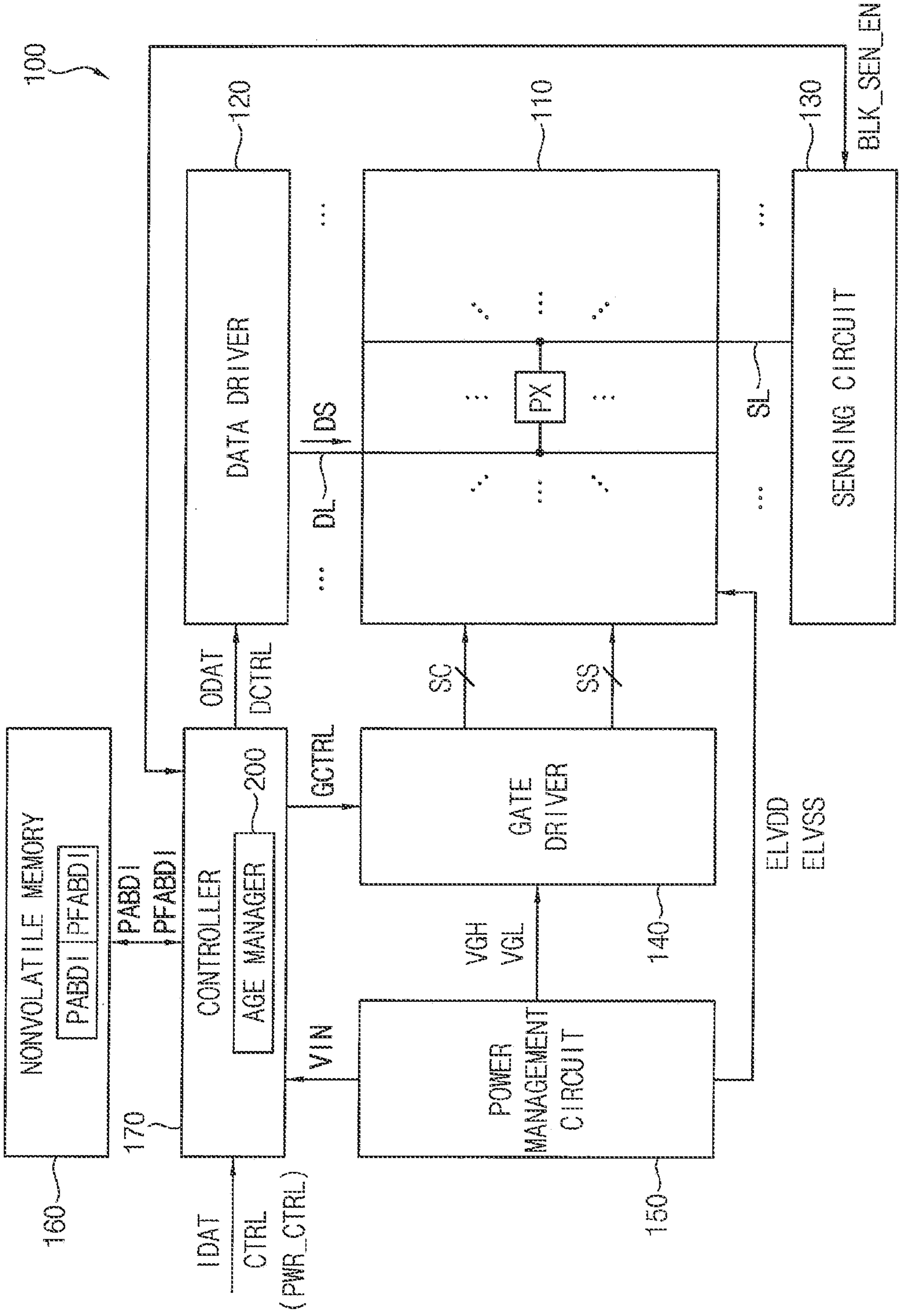
FIG. 1 is a block diagram illustrating an organic light-emitting diode (OLED) display device according to an embodiment.
Figure 2:
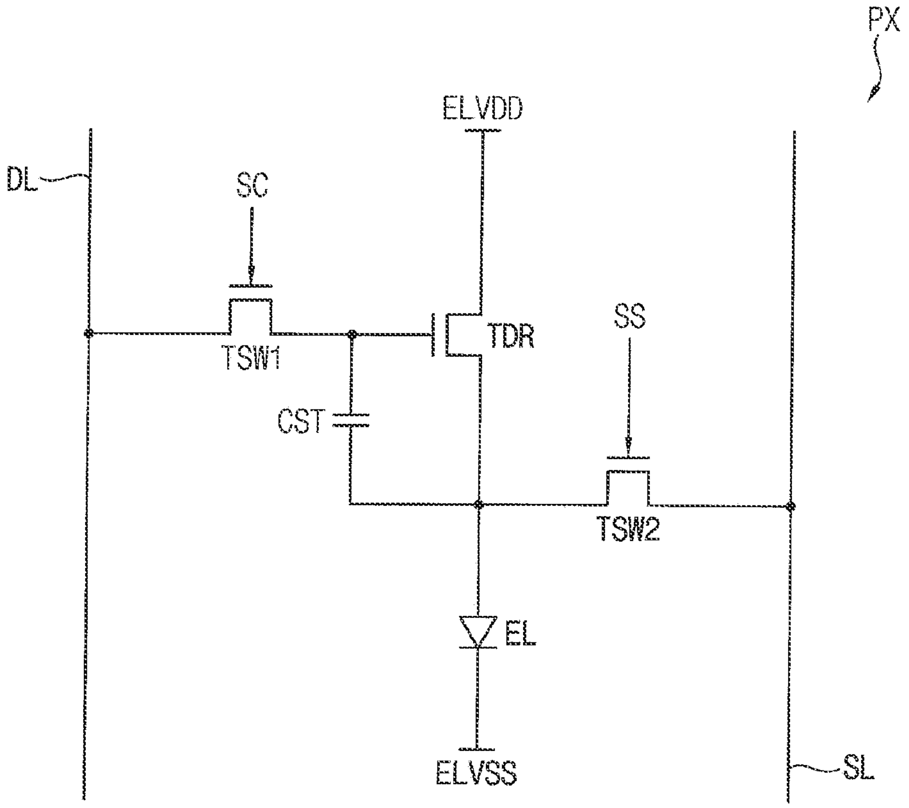
FIG. 2 is a circuit diagram illustrating an example of a pixel included in an OLED display device according to an embodiment.
Figure 3:
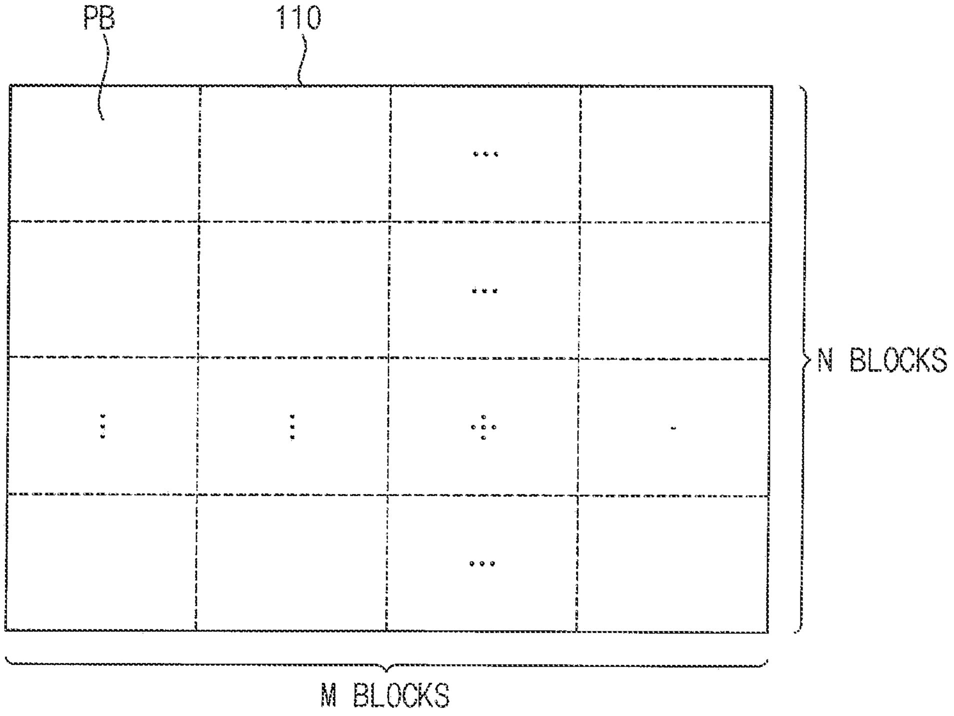
FIG. 3 is a schematic diagram illustrating an example where a plurality of pixels of a display panel is grouped into a plurality of pixel blocks.
Figure 4:
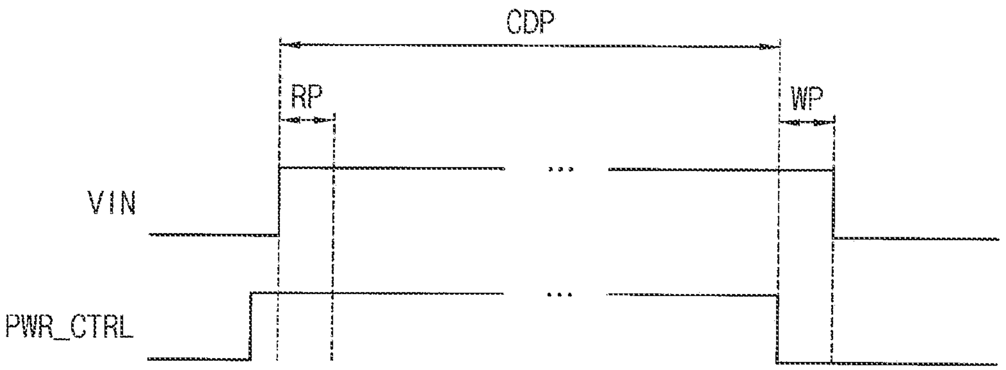
FIG. 4 is a timing diagram for describing an example where a controller performs a read operation and a write operation for a nonvolatile memory in an OLED display device according to an embodiment.
Figure 5:
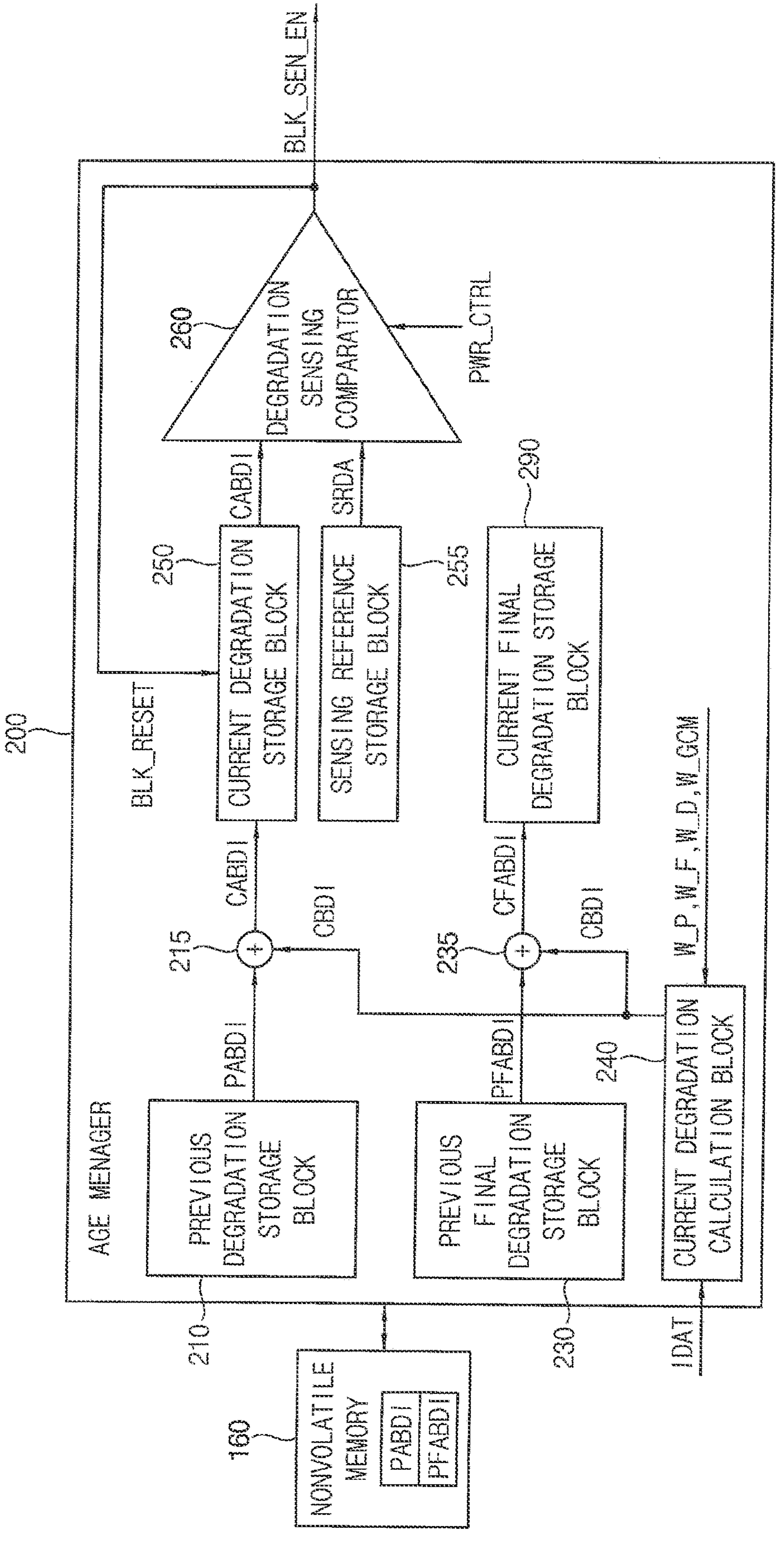
FIG. 5 is a block diagram illustrating an example of an age manager included in an OLED display device according to an embodiment.

FIG. 1 illustrates an organic light-emitting diode (OLED) display device according to an embodiment, FIG. 2 illustrates an example of a pixel included in an OLED display device according to an embodiment, FIG. 3 illustrates an example where a plurality of pixels of a display panel is grouped into a plurality of pixel blocks, FIG. 4 illustrates an example where a controller performs a read operation and a write operation for a nonvolatile memory in an OLED display device according to an embodiment, and FIG. 5 illustrates an example of an age manager included in an OLED display device according to an embodiment.

Referring to FIG. 1, an OLED display device 100 according to an embodiment may include a display panel 110, a data driver 120, a sensing circuit 130, a gate driver 140, a power management circuit 150, a nonvolatile memory 160 and a controller 170.

The display panel 110 may include a plurality of data lines DL, a plurality of sensing lines SL, and a plurality of pixels PX coupled to the plurality of data lines DL and the plurality of sensing lines SL. In an embodiment, the number of the plurality of sensing lines SL may be substantially the same as the number of the plurality of data lines DL. In another embodiment, the number of the plurality of sensing lines SL may be different from the number of the plurality of data lines DL. For example, the display panel 110 may include one sensing line SL per every three data lines DL. In an embodiment, the display panel 110 may further include a plurality of scan signal lines for transferring scan signals SC to the plurality of pixels PX, and a plurality of sensing signal lines for transferring sensing signals SS to the plurality of pixels PX. In an embodiment, each pixel PX may include an organic light-emitting diode (OLED), and the display panel 110 may be an OLED panel.

For example, as illustrated in FIG. 2, each pixel PX may include a driving transistor TDR, a first switching transistor TSW1, a second switching transistor TSW2, a storage capacitor CST and an organic light-emitting diode EL.

The storage capacitor CST may store a data signal DS transferred through the data line DL. In an embodiment, the storage capacitor CST may include a first electrode coupled to a gate of the driving transistor TDR, and a second electrode coupled to a source of the driving transistor TDR.

The first switching transistor TSW1 may couple the data line DL to the first electrode of the storage capacitor CST in response to the scan signal SC. Thus, the first switching transistor TSW1 may transfer the data signal DS of the data line DL to the first electrode of the storage capacitor CST in response to the scan signal SC. In an embodiment, the first switching transistor TSW1 may include a gate receiving the scan signal SC, a drain coupled to the data line DL, and a source coupled to the first electrode of the storage capacitor CST and the gate of the driving transistor TDR.

The second switching transistor TSW2 may couple the sensing line SL to the second electrode of the storage capacitor CST and the source of the driving transistor TDR in response to the sensing signal SS. In an embodiment, the second switching transistor TSW2 may include a gate receiving the sensing signal SS, a drain coupled to the source of the driving transistor TDR, and a source coupled to the sensing line SL.

The driving transistor TDR may generate a driving current based on the data signal DS stored in the storage capacitor CST. In an embodiment, the driving transistor TDR may include the gate coupled to the first electrode of the storage capacitor CST, a drain receiving a first power supply voltage ELVDD (e.g., a high power supply voltage), and the source coupled to the second electrode of the storage capacitor CST and the drain of the second switching transistor TSW2.

The organic light-emitting diode EL may emit light in response to the driving current generated by the driving transistor TDR. In an embodiment, the organic light-emitting diode EL may include an anode coupled to the source of the driving transistor TDR, and a cathode receiving a second power supply voltage ELVSS (e.g., a low power supply voltage).

In an embodiment, as illustrated in FIG. 2, the driving transistor TDR, the first switching transistor TSW1 and the second switching transistor TSW2 may be implemented with, but are not limited to, NMOS transistors. Further, a configuration of the pixel PX according to an embodiment is not limited to the example of FIG. 2. In another embodiment, the display panel 110 may be an inorganic light-emitting diode display panel, a quantum dot light-emitting diode display panel, a liquid crystal display (LCD) panel, or any other suitable display panel.

In an embodiment, the plurality of pixels PX of the display panel 110 may be grouped into a plurality of pixel blocks, and a sensing operation (e.g., a transistor sensing operation and/or a diode sensing operation) of the OLED display device 100 according to an embodiment may be selectively performed per each pixel block. For example, as illustrated in FIG. 3, the display panel 110 may be divided into N*M pixel blocks PB each including a plurality of pixels PX, where N and M are integers greater than 1. Here, the pixel block PB may be a logical group for which the sensing operation is determined to be performed, and the respective pixel blocks PB need not be physically distinguished from each other.

The data driver 120 may generate the data signals DS based on output image data ODAT and a data control signal DCTRL received from the controller 170, and may provide the data signals DS to the plurality of pixels PX through the plurality of data lines DL. In an embodiment, the data control signal DCTRL may include, but is not limited to, an output data enable signal, a horizontal start signal and/or a load signal. In an embodiment, the controller 170 may correct input image data IDAT based on a driving characteristic of the driving transistor TDR and/or a voltage-current characteristic of the organic light-emitting diode EL sensed by the transistor sensing operation and/or the diode sensing operation, and the data driver 120 may receive the corrected input image data IDAT as the output image data ODAT from the controller 170. In an embodiment, the data driver 120 and the sensing circuit 130 may be implemented with a single integrated circuit. The single integrated circuit including the data driver 120 and the sensing circuit 130 may be referred to as a readout-source driver integrated circuit (RSIC). In another embodiment, the data driver 120 and the controller 170 may be implemented with a single integrated circuit. The single integrated circuit including the data driver 120 and the controller 170 may be referred to as a timing controller embedded data driver (TED) integrated circuit. In still another embodiment, the data driver 120, the sensing circuit 130 and the controller 170 may be implemented with separate integrated circuits.

Figure 12:
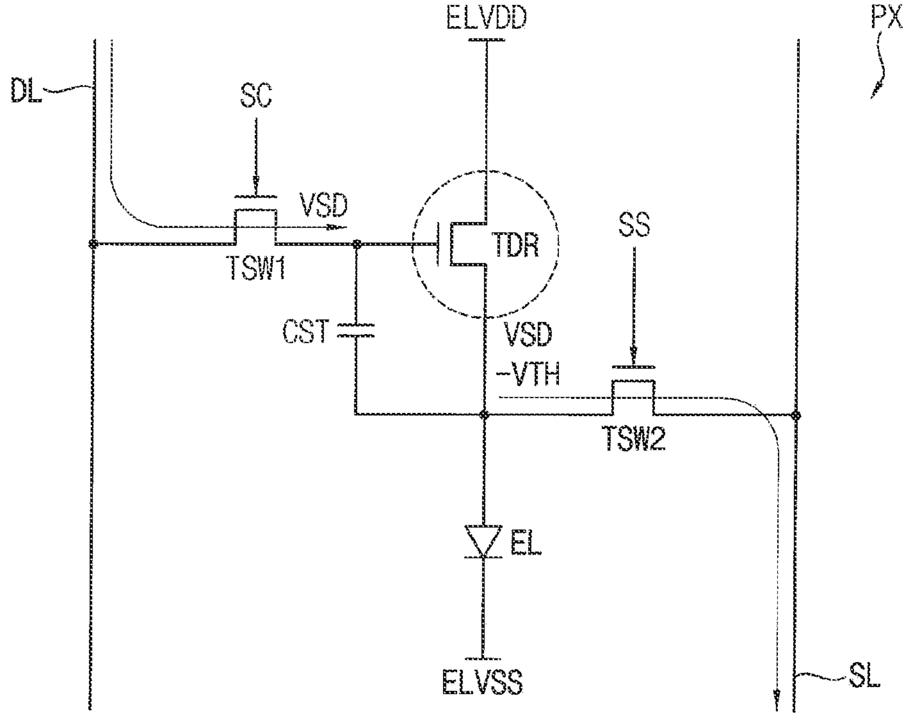
FIG. 12 is a circuit diagram illustrating an example of a pixel on which a transistor sensing operation is performed.
Figure 13:
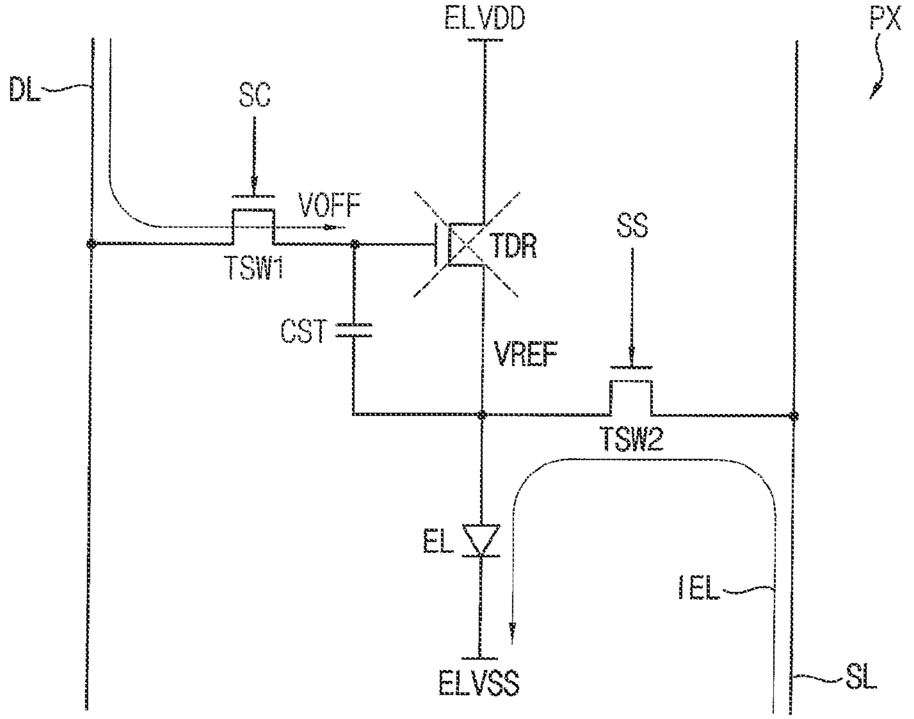
FIG. 13 is a circuit diagram illustrating an example of a pixel on which a diode sensing operation is performed.

The sensing circuit 130 may be coupled to the plurality of sensing lines SL of the display panel 110, and may perform the sensing operation on the plurality of pixels PX through the plurality of sensing lines SL. In the OLED display device 100 according to an embodiment, the sensing circuit 130 may selectively perform the sensing operation for each pixel block PB. In an embodiment, the sensing operation for each pixel block PB performed by the sensing circuit 130 may include the transistor sensing operation that senses driving characteristics (e.g., threshold voltages VTH and/or mobility) of the driving transistors TDR of a plurality of pixels PX included in the pixel block PB as illustrated in FIG. 12, and/or the diode sensing operation that senses characteristics, such as voltage (e.g., VREF) to current (e.g., IEL)

characteristics of the organic light-emitting diodes EL of the plurality of pixels PX included in the pixel block PB as illustrated in FIG. 13.

The gate driver 140 may receive a gate control signal GCTRL from the controller 170, may receive a high gate voltage VGH and a low gate voltage VGL from the power management circuit 150, and may provide the scan signals SC and/or the sensing signals SS to the plurality of pixels PX based on the gate control signal GCTRL, the high gate voltage VGH and the low gate voltage VGL. In an embodiment, the gate control signal GCTRL may include, but is not limited to, a scan start signal and/or a scan clock signal. In an embodiment, the gate driver 140 may be integrated or formed in a peripheral portion of the display panel 110. In another embodiment, the gate driver 140 may be implemented with one or more integrated circuits.

The power management circuit 150 may generate voltages VIN, VGH, VGL, ELVDD and ELVSS for operation of the OLED display device 100. In an embodiment, the power management circuit 150 may generate, but is not limited to, a power supply voltage VIN for the controller 170, the high and low gate voltages VGH and VGL for the controller 170, and/or high and low power supply voltages ELVDD and ELVSS for the display panel 110. In an embodiment, the power management circuit 150 may be implemented with at least one integrated circuit, and the integrated circuit may be referred to as a power management integrated circuit (PMIC). In another embodiment, the power management circuit 150 may be included in the controller 170.

The nonvolatile memory 160 may store previous accumulated block degradation information PABDI representing accumulated block degradation amounts for each of the plurality of pixel blocks PB up to a previous driving period. For example, the previous accumulated block degradation information PABDI may represent the accumulated block degradation amounts of the plurality of pixel blocks PB from a driving period directly after the sensing operation is performed up to the previous driving period directly before a current driving period. Thus, the accumulated block degradation amount of a corresponding pixel block PB represented by the previous accumulated block degradation information PABDI may be calculated by accumulating or summing block degradation amounts of the corresponding pixel block PB in driving periods from the driving period directly after the sensing operation is performed up to the previous driving period directly before the current driving period. In an embodiment, the nonvolatile memory 160 may further store previous final accumulated block degradation information PFABDI representing accumulated block degradation amounts for the plurality of pixel blocks PB from an initial driving period that is a first driving period after the OLED display device 100 is manufactured up to the previous driving period. For example, the accumulated block degradation amount of a corresponding pixel block PB represented by the previous final accumulated block degradation information PFABDI may be calculated by accumulating or summing block degradation amounts of the corresponding pixel block PB in driving periods from the initial driving period up to the previous driving period directly before the current driving period. In an embodiment, the nonvolatile memory 160 may further store a characteristic (or a degradation amount of the characteristic) of each pixel PX sensed by the sensing operation. For example, the sensing circuit 130 may perform the transistor sensing operation for the driving transistors TDR of the plurality of pixels PX included in the pixel block PB, and/or the diode sensing operation for the organic light-emitting diodes EL of the plurality of pixels PX included in the pixel block PB, and the nonvolatile memory 160 may store characteristics (or degradation amounts of the characteristics) of the driving transistors TDR sensed by the transistor sensing operation, and/or store characteristics (or degradation amounts of the characteristics) of the organic light-emitting diodes EL sensed by the diode sensing operation.

The controller 170, such as a timing controller (TCON), may receive the input image data IDAT and a control signal CTRL from an external host processor such as a graphics processing unit (GPU), an application processor (AP) or a graphics card. In an embodiment, the input image data IDAT may be Red Green Blue (RGB) image data including red image data, green image data and blue image data. In an embodiment, the control signal CTRL may include a power control signal PWR_CTRL indicating a power-on or a power-off. For example, the power control signal PWR_CTRL having a high level may indicate the power-on, and the power control signal PWR_CTRL having a low level may indicate the power-off. In an embodiment, the control signal CTRL may further include, but is not limited to, a vertical synchronization signal, a horizontal synchronization signal, an input data enable signal, a master clock signal, and/or the like. Further, the controller 170 may generate the output image data ODAT by correcting the input image data IDAT based on the characteristics (or the degradation amounts of the characteristics) of the driving transistors TDR and/or the characteristics (or the degradation amounts of the characteristics) of the organic light-emitting diodes EL stored in the nonvolatile memory 160. The data signals DS generated based on the output image data ODAT may compensate for the degradation of the driving transistors TDR and/or the degradation of the organic light-emitting diodes EL. The controller 170 may control an operation of the gate driver 140 by providing the gate control signal GCTRL to the gate driver 140, and may control an operation of the data driver 120 by providing the output image data ODAT and the data control signal DCTRL to the data driver 120. Further, the controller 170 may provide the sensing circuit 130 with a block sensing enable signal BLK_SEN_EN representing whether the sensing operation for each pixel block PB is to be performed, and the sensing circuit 130 may selectively perform the sensing operation on the pixel block PB in response to the block sensing enable signal BLK_SEN_EN.

In the OLED display device 100 according to an embodiment, the controller 170 may include an age manager 200 that determines whether or when the sensing operation for each of the plurality of pixel blocks PB is to be performed. The age manager 200 may read the previous accumulated block degradation information PABDI representing the accumulated block degradation amounts for the plurality of pixel blocks PB up to the previous driving period from the nonvolatile memory 160, may calculate current block degradation information representing block degradation amounts for the plurality of pixel blocks PB in the current driving period, may calculate current accumulated block degradation information representing accumulated block degradation amounts for the plurality of pixel blocks PB up to the current driving period by adding the current block degradation information to the previous accumulated block degradation information PABDI at an end time point of the current driving period, and may write the current accumulated block degradation information to the nonvolatile memory 160 where the current accumulated block degradation information in the current driving period is used as the previous accumulated block degradation information PABDI in a next driving period. For example, as illustrated in FIG. 4, when the OLED display device 100 receives the power control signal PWR_CTRL having the high level indicating the power-on of the OLED display device 100, the power management circuit 150 may generate the power supply voltage VIN for the controller 170, and the age manager 200 may read the previous accumulated block degradation information PABDI from the nonvolatile memory 160 in a read period RP. Further, in response to the power control signal PWR_CTRL indicating the power-on, the OLED display device 100 may initiate the current driving period CDP in which the OLED display device 100 operates. At the end time point of the current driving period CDP, or when the OLED display device 100 receives the power control signal PWR_CTRL having the low level indicating the power-off of the OLED display device 100, the age manager 200 may calculate the current accumulated block degradation information by adding the current block degradation information to the previous accumulated block degradation information PABDI, and may write the current accumulated block degradation information to the nonvolatile memory 160 in a write period WP where the current accumulated block degradation information in the current driving period CDP is used as the previous accumulated block degradation information PABDI in the next driving period. Although FIG. 4 illustrates an example where the read period RP corresponds to an initial portion of the current driving period CDP, the read period RP is not limited to the example of FIG. 4, and may correspond to any portion of the current driving period CDP. For example, the read period RP may be initiated at the end time point of the current driving period CDP, and then the write period WP may be initiated after the read period RP.

Further, the age manager 200 may determine whether the sensing operation for each of the plurality of pixel blocks PB is to be performed by comparing the current accumulated block degradation information for each of the plurality of pixel blocks PB with a sensing reference degradation amount. In an embodiment, to determine whether the sensing operation for each pixel block PB is to be performed, as illustrated in FIG. 5, the age manager 200 may include a previous degradation storage block 210, a previous final degradation storage block 230, a current degradation calculation block 240, a degradation addition block 215, a final degradation addition block 235, a current degradation storage block 250, a current final degradation storage block 290, a sensing reference storage block 255 and a degradation sensing comparator 260.

The age manager 200 may read the previous accumulated block degradation information PABDI and the previous final accumulated block degradation information PFABDI from the nonvolatile memory 160, the previous degradation storage block may store the previous accumulated block degradation information PABDI read from the nonvolatile memory 160, and the previous final degradation storage block 230 may store the previous final accumulated block degradation information PFABDI read from the nonvolatile memory 160. In an embodiment, the age manager 200 may read the previous accumulated block degradation information PABDI and the previous final accumulated block degradation information PFABDI from the nonvolatile memory 160 in response to the power control signal PWR_CTRL indicating the power-on. Thus, the age manager 200 may perform a read operation for the nonvolatile memory 160 in the read period RP corresponding to the initial portion of the current driving period CDP.

The current degradation calculation block 240 may calculate the current block degradation information CBDI representing the block degradation amounts for the plurality of pixel blocks PB in the current driving period CDP. In an embodiment, the current degradation calculation block 240 may divide the input image data IDAT for the display panel 110 into a plurality of block image data for the plurality of pixel blocks PB. To calculate the current block degradation information CBDI for each pixel block PB, the current degradation calculation block 240 may accumulate or sum representative gray levels (e.g., average gray levels, maximum gray levels, minimum gray levels, or the like) of the plurality of block image data for the pixel block PB in respective frame periods of the current driving period CDP. Thus, the current block degradation information CBDI, or the block degradation amount of the pixel block PB that is driven based on the block image data representing relatively high gray levels in the current driving period CDP may be greater than the current block degradation information CBDI, or the block degradation amount of the pixel block PB that is driven based on the block image data representing relatively low gray levels in the current driving period CDP.

In an embodiment, the current degradation calculation block 240 may calculate the current block degradation information CBDI in the current driving period CDP by applying at least one of block position weights W_P determined according to positions of the plurality of pixel blocks PB, driving frequency weights W_F determined according to driving frequencies of the plurality of pixel blocks PB, emission duty weights W_D determined according to emission duties of the plurality of pixel blocks PB, and/or a global current modulation compensation value W_GCM for the display panel 110 to the plurality of block image data. For example, the plurality of pixel blocks PB may have different block position weights W_P according to positions thereof, and the block position weights W_P may be determined according to a characteristic of the display panel 110 when the OLED display device 100 is manufactured. Further, for example, the driving frequency weights W_F may increase as the driving frequencies of the plurality of pixel blocks PB increase, and may decrease as the driving frequencies of the plurality of pixel blocks PB decrease. According to an embodiment, at one time point, the plurality of pixel blocks PB is driven at substantially the same driving frequency, or may be driven at different driving frequencies. In a case where the plurality of pixel blocks PB may be driven at substantially the same driving frequency, the driving frequency weights W_F of the plurality of pixel blocks PB may have substantially the same value. Further, for example, the emission duty weights W_D may increase as the emission duties of the plurality of pixel blocks PB increase, and may decrease as the emission duties of the plurality of pixel blocks PB decrease. According to an embodiment, at one time point, the plurality of pixel blocks PB may be driven with substantially the same emission duty, or may be driven with different emission duties. In a case where the plurality of pixel blocks PB is driven with substantially the same emission duty, the emission duty weights W_D of the plurality of pixel blocks PB may have substantially the same value. Further, in a case where a panel current of the display panel 110 is greater than or equal to a predetermined reference current, a global current modulation (GCM) may be performed to decrease the panel current, and the global current modulation compensation value W_GCM may be determined according to a level of the GCM or a decreasing amount of the panel current. For example, the global current modulation compensation value W_GCM may decrease as the decreasing amount of the panel current increases, the current block degradation information CBDI may decrease as the global current modulation compensation value W_GCM decreases. In an embodiment, the same global current modulation compensation value W_GCM may be applied with respect to all the pixel blocks PB, but embodiments are not limited thereto.

The degradation addition block 215 may calculate the current accumulated block degradation information CABDI representing the accumulated block degradation amounts for the plurality of pixel blocks PB from the driving period directly after the sensing operation is performed up to the current driving period CDP by adding the current block degradation information CBDI to the previous accumulated block degradation information PABDI, and the current degradation storage block 250 may store the current accumulated block degradation information CABDI calculated by the degradation addition block 215. Further, the final degradation addition block 235 may calculate current final accumulated block degradation information CFABDI representing the accumulated block degradation amounts for the plurality of pixel blocks PB from the initial driving period up to the current driving period CDP by adding the current block degradation information CBDI to the previous final accumulated block degradation information PFABDI, and the current final degradation storage block 290 may store the current final accumulated block degradation information CFABDI calculated by the final degradation addition block 235. In an embodiment, calculating the current accumulated block degradation information CABDI by the degradation addition block 215 and calculating the current final accumulated block degradation information CFABDI by the final degradation addition block 235 may be performed in response to the power control signal PWR_CTRL indicating the power-off. Until the sensing operation for each pixel block PB is performed after the OLED display device 100 is manufactured, the current accumulated block degradation information CABDI for the pixel block PB may be substantially the same as the current final accumulated block degradation information CFABDI for the pixel block PB. However, once the sensing operation for the pixel block PB is performed, the current accumulated block degradation information CABDI for the pixel block PB may be reset, and may become different from the current final accumulated block degradation information CFABDI for the pixel block PB.

The sensing reference storage block 255 may store the sensing reference degradation amount SRDA, and the degradation sensing comparator 260 may compare the current accumulated block degradation information CABDI with the sensing reference degradation amount SRDA stored in the sensing reference storage block 255 to determine whether the sensing operation for each pixel block PB is to be performed. In an embodiment, in response to the power control signal PWR_CTRL indicating the power-off, the degradation sensing comparator 260 may perform a comparison operation between the current accumulated block degradation information CABDI and the sensing reference degradation amount SRDA. For example, the degradation sensing comparator 260 may determine that the sensing operation for each pixel block PB is not to be performed in a first case where the current accumulated block degradation information CABDI (or the accumulated block degradation amount represented by the current accumulated block degradation information CABDI) for the pixel block PB is less than the sensing reference degradation amount SRDA, and may determine that the sensing operation for the pixel block PB is to be performed in a second case where the current accumulated block degradation information CABDI (or the accumulated block degradation amount represented by the current accumulated block degradation information CABDI) for the pixel block PB is greater than or equal to the sensing reference degradation amount SRDA. Further, in an embodiment, the degradation sensing comparator 260 may generate the block sensing enable signal BLK_SEN_EN representing whether the sensing operation for each pixel block PB is to be performed, and the sensing circuit 130 may selectively perform the sensing operation on the pixel block PB in response to the block sensing enable signal BLK_SEN_EN.

Further, the degradation sensing comparator 260 may reset the current accumulated block degradation information CABDI greater than or equal to the sensing reference degradation amount SRDA among the current accumulated block degradation information CABDI stored in the current degradation storage block 250. For example, the degradation sensing comparator 260 may generate the block sensing enable signal BLK_SEN_EN representing whether the sensing operation for each pixel block PB is to be performed, and the block sensing enable signal BLK_SEN_EN may be provided as a block reset signal BLK_RESET to the current degradation storage block 250. The current degradation storage block 250 may reset the current accumulated block degradation information CABDI for the pixel block PB for which the sensing operation is determined to be performed to an initial degradation amount, for example a value of 0.

The age manager 200 may write the current accumulated block degradation information CABDI and the current final accumulated block degradation information CFABDI to the nonvolatile memory 160 in response to the power control signal PWR_CTRL indicating the power-off where the current accumulated block degradation information CABDI and the current final accumulated block degradation information CFABDI in the current driving period CDP is used as the previous accumulated block degradation information PABDI and the previous final accumulated block degradation information PFABDI in the next driving period. For example, the age manager 200 may perform a write operation for the nonvolatile memory 160 in the write period WP directly after the current driving period CDP. Since the current accumulated block degradation information CABDI for the pixel block PB for which the sensing operation is determined to be performed is reset to the initial degradation amount or the value of 0, the previous accumulated block degradation information PABDI for the pixel block PB in the next driving period may represent the initial degradation amount or the value of zero (0).

As described above, in the OLED display device 100 according to an embodiment, the current accumulated block degradation information CABDI for the plurality of pixel blocks PB may be calculated by adding the current block degradation information CBDI to the previous accumulated block degradation information PABDI, and whether the sensing operation for each of the plurality of pixel blocks PB is to be performed may be determined by comparing the current accumulated block degradation information CABDI for each of the plurality of pixel blocks PB with the sensing reference degradation amount SRDA. Accordingly, the sensing operation for each of the plurality of pixel blocks PB may be selectively performed, and thus a sensing time in which the sensing operation is performed may be decreased compared with a case where the sensing operation is performed on each of the pixels PX in the entire display panel 110.

Figure 6:
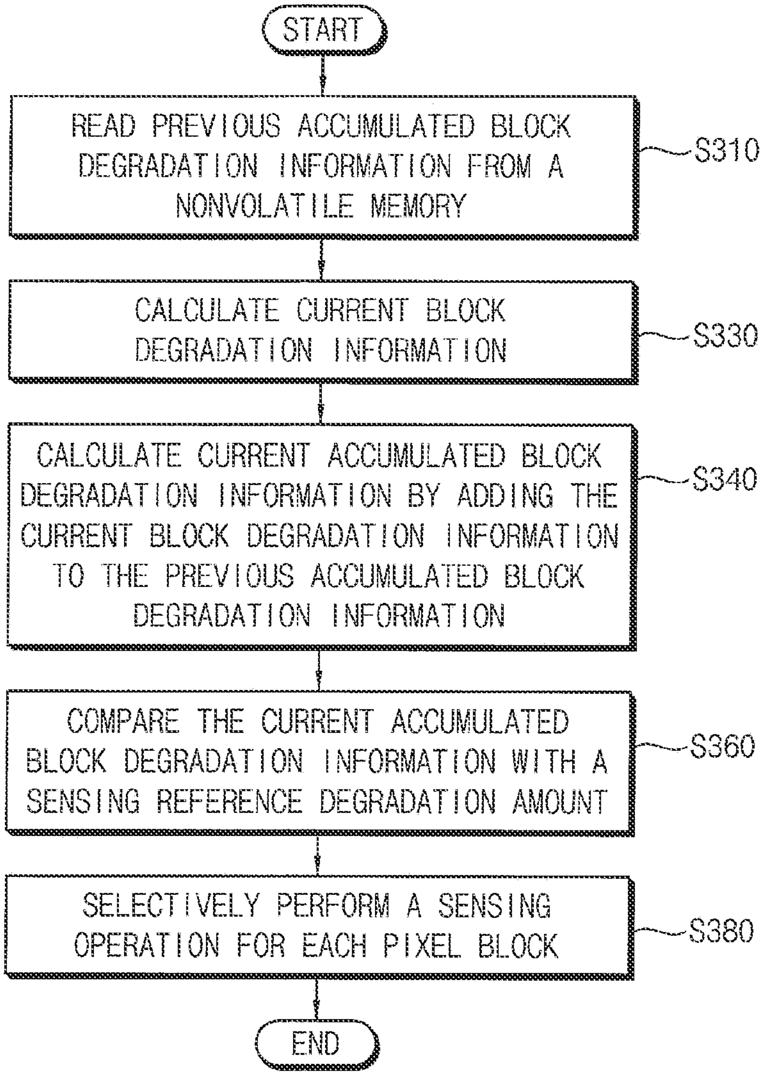
FIG. 6 is a flowchart illustrating a method of sensing degradation of an OLED display device according to an embodiment.
Figure 7:
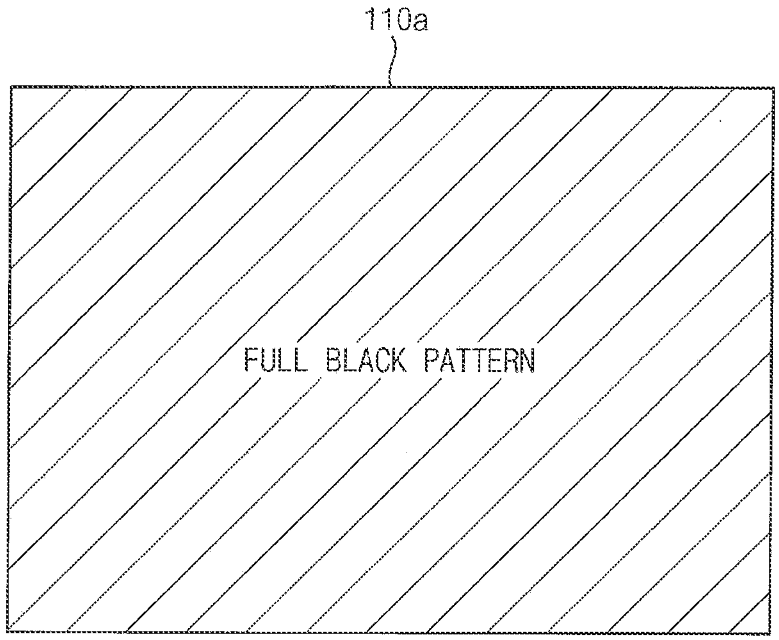
FIG. 7 is a schematic diagram illustrating an example of a display panel that displays a full black pattern in a current driving period.
Figure 8:
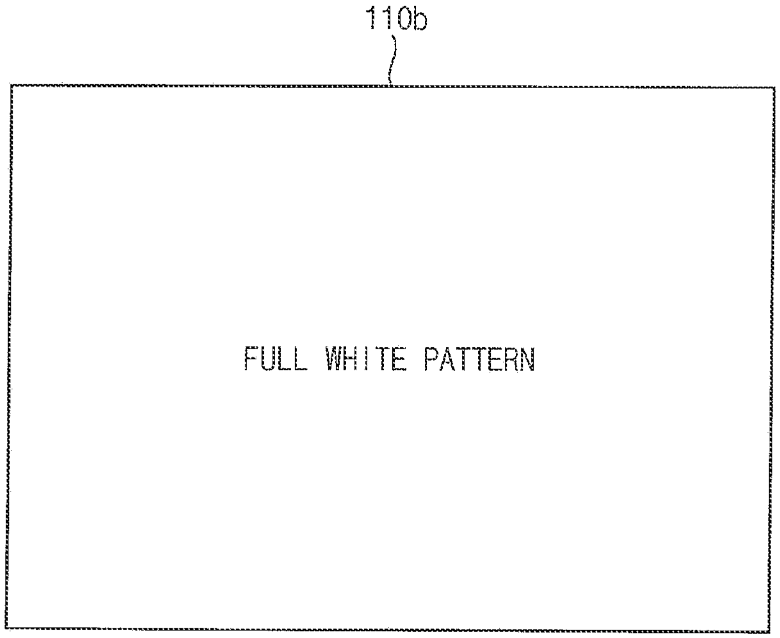
FIG. 8 is a schematic diagram illustrating an example of a display panel that displays a full white pattern in a current driving period.
Figure 9:
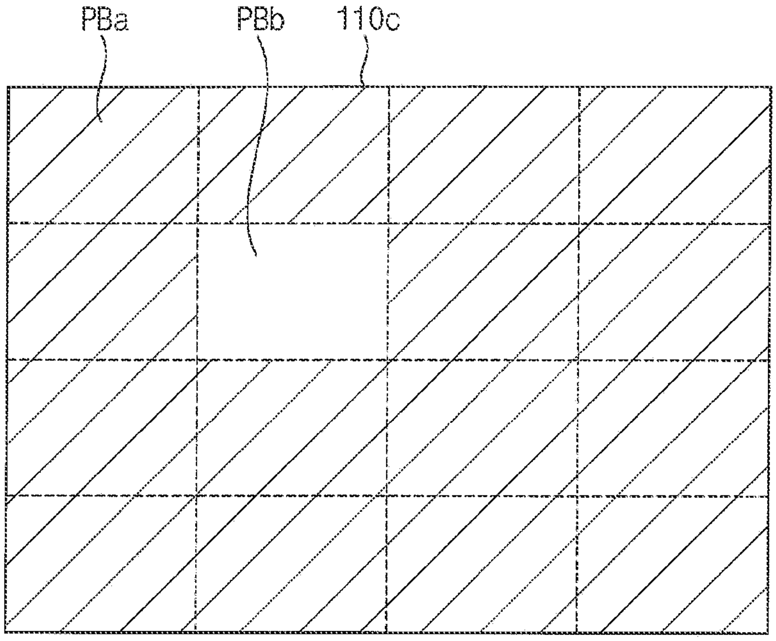
FIG. 9 is a schematic diagram illustrating an example of a display panel that displays a partial white pattern in a current driving period.

FIG. 6 illustrates a method of sensing degradation of an OLED display device according to an embodiment, FIG. 7 illustrates an example of a display panel that displays a full black pattern in a current driving period, FIG. 8 illustrates an example of a display panel that displays a full white pattern in a current driving period, and FIG. 9 illustrates an example of a display panel that displays a partial white pattern in a current driving period.

Referring to FIGS. 1, 5 and 6, in a method of sensing degradation of an OLED display device 100 according to an embodiment, an age manager 200 may read previous accumulated block degradation information PABDI representing accumulated block degradation amounts for a plurality of pixel blocks up to a previous driving period from a nonvolatile memory 160 at function block S310. In an embodiment, the age manager 200 may further read previous final accumulated block degradation information PFABDI representing accumulated block degradation amounts for the plurality of pixel blocks from an initial driving period up to the previous driving period from the nonvolatile memory 160.

The age manager 200 may calculate current block degradation information CBDI representing block degradation amounts for the plurality of pixel blocks in a current driving period at function block S330, and may calculate current accumulated block degradation information CABDI representing accumulated block degradation amounts for the plurality of pixel blocks up to the current driving period by adding the current block degradation information CBDI to the previous accumulated block degradation information PABDI in response to a power control signal PWR_CTRL indicating a power-off at function block S340. In an embodiment, the age manager 200 may further calculate current final accumulated block degradation information CFABDI representing accumulated block degradation amounts for the plurality of pixel blocks from the initial driving period up to the current driving period by adding the current block degradation information CBDI to the previous final accumulated block degradation information PFABDI in response to the power control signal PWR_CTRL indicating the power-off.

The age manager 200 may determine whether a sensing operation for each of the plurality of pixel blocks is to be performed by comparing the current accumulated block degradation information CABDI for each of the plurality of pixel blocks with a sensing reference degradation amount SRDA at function block S360. In an embodiment, the age manager 200 may determine that the sensing operation for each pixel block is not to be performed in a first case where the current accumulated block degradation information CABDI for the pixel block is less than the sensing reference degradation amount SRDA, and may determine that the sensing operation for the pixel block is to be performed in a second case where the current accumulated block degradation information CABDI for the pixel block is greater than or equal to the sensing reference degradation amount SRDA. Further, the age manager 200 may reset the current accumulated block degradation information CABDI for the pixel block for which the sensing operation is determined to be performed to an initial degradation amount.

A sensing circuit 130 may receive a block sensing enable signal BLK_SEN_EN representing whether the sensing operation for each pixel block is to be performed from the age manager 200, and may selectively perform the sensing operation on the pixel block in response to the block sensing enable signal BLK_SEN_EN at function block S380. In an embodiment, with respect to the pixel block for which the sensing operation is determined to be performed, the sensing circuit 130 may perform a transistor sensing operation for driving transistors of the plurality of pixels PX included in the pixel block, and/or a diode sensing operation for organic light-emitting diodes of the plurality of pixels PX included in the pixel block.

For example, in a case where a display panel 110*a* displays a full black pattern during the current driving period as illustrated in FIG. 7, the current block degradation information CBDI of all pixel blocks of the display panel 110*a* may represent block degradation amounts of 0, and accumulated block degradation amounts represented by the current accumulated block degradation information CABDI of all the pixel blocks need not be increased compared with accumulated block degradation amounts represented by the previous accumulated block degradation information PABDI. Thus, the current accumulated block degradation information CABDI of all the pixel blocks may be less than the sensing reference degradation amount SRDA, the age manager 200 may determine that the sensing operation for all the pixel blocks is determined not to be performed, and the sensing circuit 130 need not perform the sensing operation for all of the pixels PX.

In another example, in a case where a display panel 110*b* displays a full white pattern during the current driving period as illustrated in FIG. 8, the current accumulated block degradation information CABDI for all pixel blocks of the display panel 110*b* may be increased compared with the previous accumulated block degradation information PABDI for all the pixel blocks. Further, in a case where the current accumulated block degradation information CABDI of all the pixel blocks is greater than or equal to the sensing reference degradation amount SRDA, the age manager 200 may determine that the sensing operation for all the pixel blocks is determined to be performed, and the sensing circuit 130 may perform the sensing operation for all of the pixels PX.

In still another example, in a case where a display panel 110*c* displays a partial white pattern including a black image for pixel blocks PBa and a white image for a pixel block PBb during the current driving period as illustrated in FIG. 9, the current accumulated block degradation information CABDI of the pixel blocks PBa need not be increased compared with the previous accumulated block degradation information PABDI of the pixel blocks PBa, and the current accumulated block degradation information CABDI of the pixel block PBb may be increased compared with the previous accumulated block degradation information PABDI of the pixel block PBb. In this case, the current accumulated block degradation information CABDI of the pixel blocks PBa may be less than the sensing reference degradation amount SRDA, and the current accumulated block degradation information CABDI of the pixel block PBb may be greater than or equal to the sensing reference degradation amount SRDA. Thus, the age manager 200 may determine that the sensing operation for only the pixel block PBb is determined to be performed, and the sensing circuit 130 may perform the sensing operation for the pixels PX included in only the pixel block PBb. Accordingly, a sensing time in which the sensing operation is performed may be decreased compared with a case where the sensing operation is performed on all of the pixels PX in the entire display panel 110.

Figure 10:
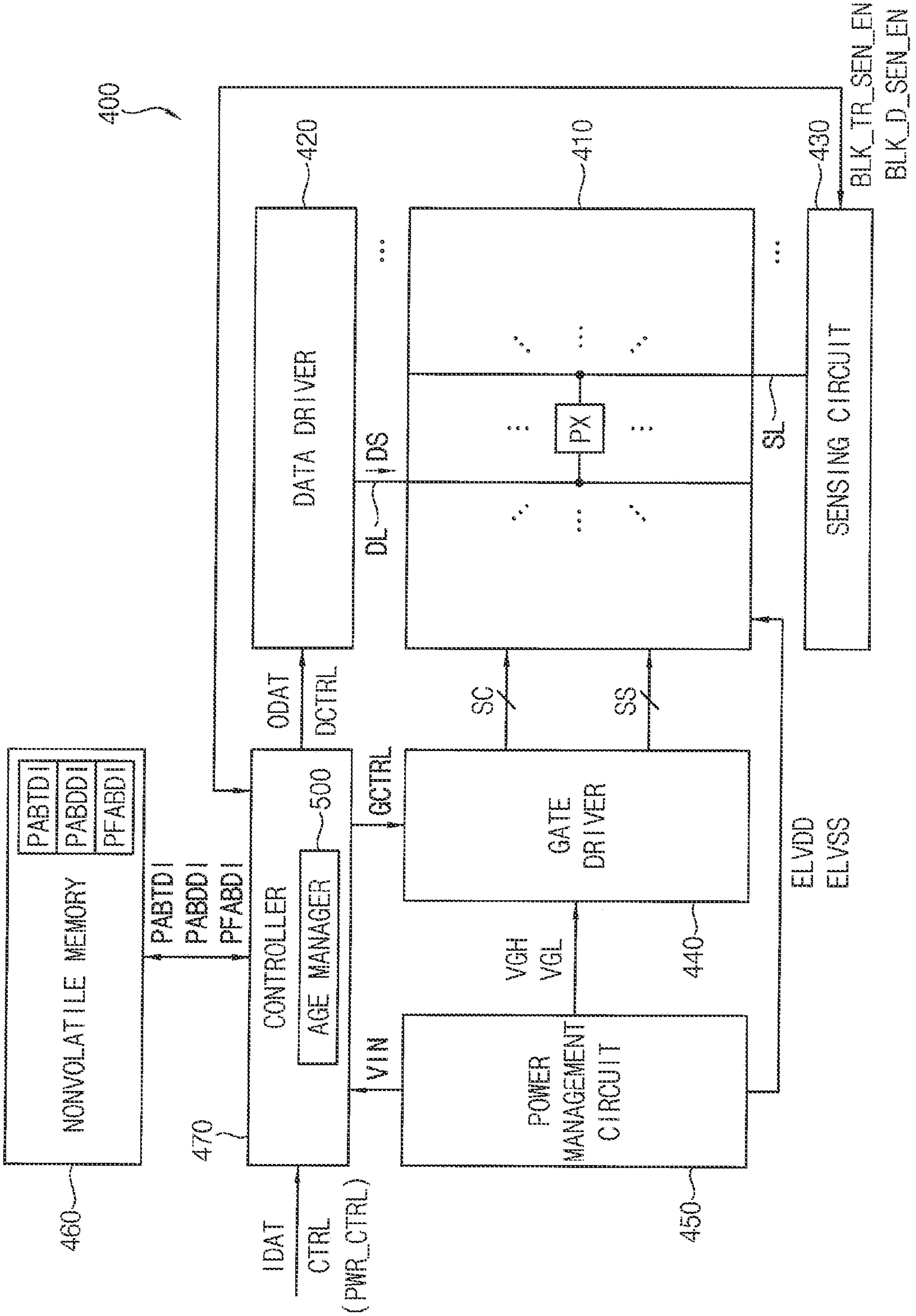
FIG. 10 is a block diagram illustrating an OLED display device according to an embodiment.
Figure 11:
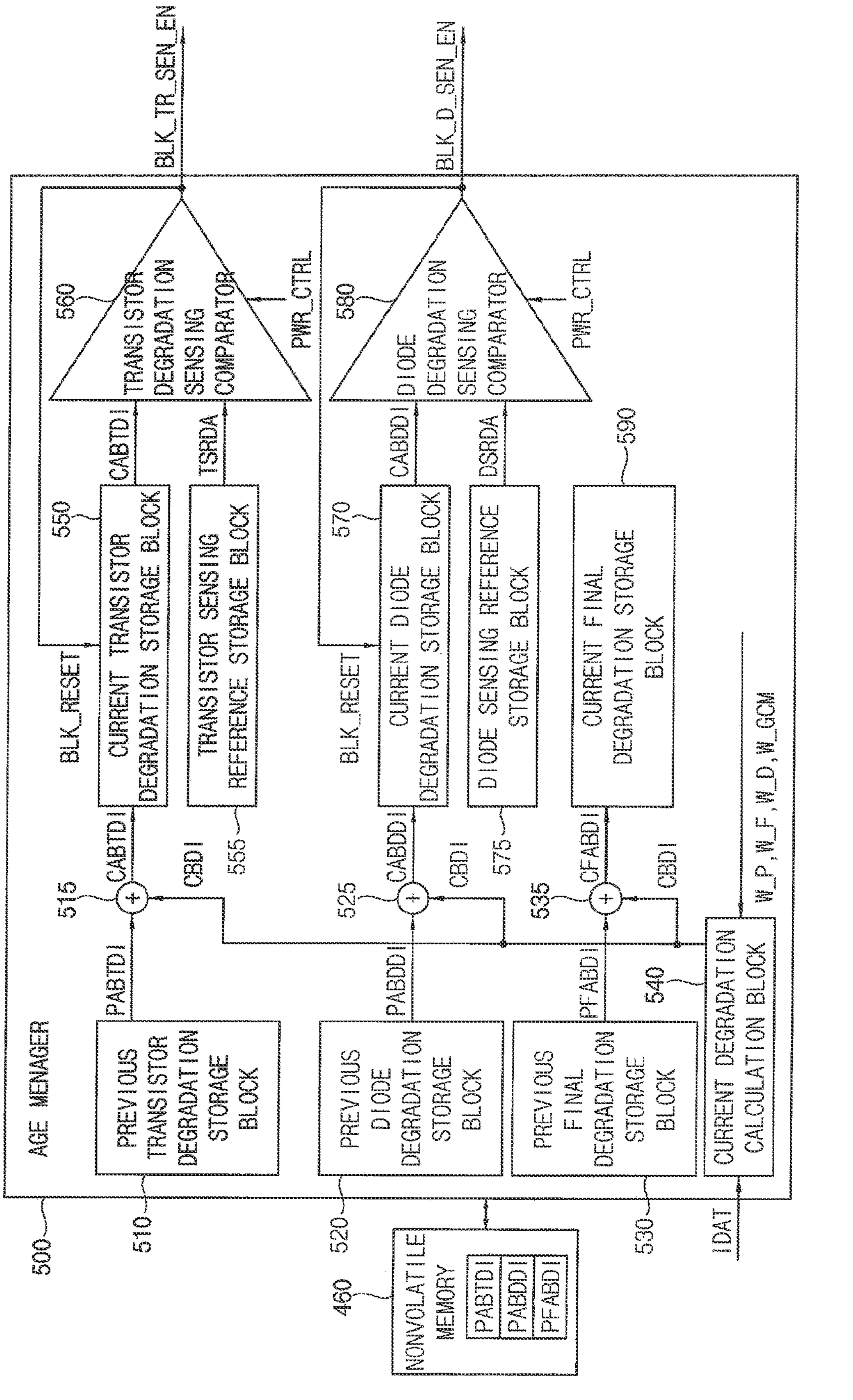
FIG. 11 is a block diagram illustrating an example of an age manager included in an OLED display device according to an embodiment.

FIG. 10 illustrates an OLED display device according to an embodiment, FIG. 11 illustrates an example of an age manager included in an OLED display device according to an embodiment, FIG. 12 illustrates an example of a pixel on which a transistor sensing operation is performed, and FIG. 13 illustrates an example of a pixel on which a diode sensing operation is performed.

Referring to FIG. 10, an OLED display device 400 according to an embodiment may include a display panel 410, a data driver 420, a sensing circuit 430, a gate driver 440, a power management circuit 450, a nonvolatile memory 460 and a controller 470. The OLED display device 400 of FIG. 10 may have a similar configuration and a similar operation to an OLED display device 100 of FIG. 1, except that the nonvolatile memory 460 may store previous accumulated block transistor degradation information PABTDI and previous accumulated block diode degradation information PABDDI as previous accumulated block degradation information PABDI, that an age manager 500 of the controller 470 may determine whether a transistor sensing operation for each respective pixel block is to be performed and/or whether a diode sensing operation for each respective pixel block is to be performed, and that the sensing circuit 430 may selectively perform the transistor sensing operation for each respective pixel block and/or may selectively perform the transistor sensing operation for each respective pixel block.

The nonvolatile memory 460 may store the previous accumulated block transistor degradation information PABTDI representing accumulated block transistor degradation amounts for driving transistors of a plurality of pixels PX included in each of a plurality of pixel blocks up to a previous driving period, and the previous accumulated block diode degradation information PABDDI representing accumulated block diode degradation amounts for organic light-emitting diodes of the plurality of pixels PX included in each of the plurality of pixel blocks up to the previous driving period. For example, the accumulated block transistor degradation amount of a corresponding pixel block PB represented by the previous accumulated block transistor degradation information PABTDI may be calculated by accumulating or summing block degradation amounts of the corresponding pixel block PB in driving periods from a driving period directly after the transistor sensing operation is performed up to the previous driving period directly before a current driving period. Further, for example, the accumulated block diode degradation amount of a corresponding pixel block PB represented by the previous accumulated block diode degradation information PABDDI may be calculated by accumulating or summing the block degradation amounts of the corresponding pixel block PB in driving periods from a driving period directly after the diode sensing operation is performed up to the previous driving period directly before the current driving period. In an embodiment, the nonvolatile memory 460 may further store previous final accumulated block degradation information PFABDI representing accumulated block degradation amounts for the plurality of pixel blocks from an initial driving period up to the previous driving period. In an embodiment, until the transistor sensing operation and the diode sensing operation for each pixel block are first performed after the OLED display device 400 is manufactured, the previous accumulated block transistor degradation information PABTDI, the previous accumulated block diode degradation information PABDDI and the previous final accumulated block degradation information PFABDI may be substantially the same as one another. Further, in an embodiment, the nonvolatile memory 460 may further store a characteristic (or a degradation amount of the characteristic) of the driving transistor of each pixel PX sensed by the transistor sensing operation, and a characteristic (or a degradation amount of the characteristic) of the organic light-emitting diode of each pixel PX sensed by the diode sensing operation.

The controller 470 may include the age manager 500 that determines whether the transistor sensing operation for each respective pixel block is to be performed and whether the diode sensing operation for each respective pixel block is to be performed. In an embodiment, to determine whether the transistor sensing operation for each respective pixel block is to be performed and to determine whether the diode sensing operation for each respective pixel block is to be performed, as illustrated in FIG. 11, the age manager 500 may include a previous transistor degradation storage block 510, a previous diode degradation storage block 520, a previous final degradation storage block 530, a current degradation calculation block 540, a transistor degradation addition block 515, a diode degradation addition block 525, a final degradation addition block 535, a current transistor degradation storage block 550, a current diode degradation storage block 570, a current final degradation storage block 590, a transistor sensing reference storage block 555, a diode sensing reference storage block 575, a transistor degradation sensing comparator 560 and/or a diode degradation sensing comparator 580.

The age manager 500 may read the previous accumulated block transistor degradation information PABTDI, the previous accumulated block diode degradation information PABDDI and the previous final accumulated block degradation information PFABDI from the nonvolatile memory 460 in response to a power control signal PWR_CTRL indicating a power-on. The previous transistor degradation storage block 510 may store the previous accumulated block transistor degradation information PABTDI read from the nonvolatile memory 460, the previous diode degradation storage block 520 may store the previous accumulated block diode degradation information PABDDI read from the nonvolatile memory 460, and the previous final degradation storage block 530 may store the previous final accumulated block degradation information PFABDI read from the nonvolatile memory 460.

The current degradation calculation block 540 may calculate current block degradation information CBDI in the current driving period. The transistor degradation addition block 515 may calculate current accumulated block transistor degradation information CABTDI for each of the plurality of pixel blocks by adding the current block degradation information CBDI to the previous accumulated block transistor degradation information PABTDI in response to the power control signal PWR_CTRL indicating a power-off of the OLED display device 400, and the current transistor degradation storage block 550 may store the current accumulated block transistor degradation information CABTDI calculated by the transistor degradation addition block 515. The diode degradation addition block 525 may calculate current accumulated block diode degradation information CABDDI for each of the plurality of pixel blocks by adding the current block degradation information CBDI to the previous accumulated block diode degradation information PABDDI in response to the power control signal PWR_CTRL indicating the power-off, and the current diode degradation storage block 570 may store the current accumulated block diode degradation information CABDDI calculated by the diode degradation addition block 525. Further, the final degradation addition block 535 may calculate current final accumulated block degradation information CFABDI for each of the plurality of pixel blocks by adding the current block degradation information CBDI to the previous final accumulated block degradation information PFABDI, and the current final degradation storage block 590 may store the current final accumulated block degradation information CFABDI calculated by the final degradation addition block 535. Until the transistor sensing operation and/or the diode sensing operation for each pixel block are first performed after the OLED display device 400 is manufactured, the current accumulated block transistor degradation information CABTDI for the pixel block and/or the current accumulated block diode degradation information CABDDI for the pixel block may be substantially the same as the current final accumulated block degradation information CFABDI for the respective pixel block. However, once the transistor sensing operation for the pixel block is performed, the current accumulated block transistor degradation information CABTDI for the pixel block may be reset, and may become different from the current accumulated block diode degradation information CABDDI for the pixel block and the current final accumulated block degradation information CFABDI for the pixel block. Further, once the diode sensing operation for the pixel block is performed, the current accumulated block diode degradation information CABDDI for the pixel block may be reset, and may become different from the current accumulated block transistor degradation information CABTDI for the pixel block and the current final accumulated block degradation information CFABDI for the pixel block.

The transistor sensing reference storage block 555 may store a transistor sensing reference degradation amount TSRDA, and the transistor degradation sensing comparator 560 may determine whether the transistor sensing operation for each pixel block is to be performed by comparing the current accumulated block transistor degradation information CABTDI with the transistor sensing reference degradation amount TSRDA stored in the transistor sensing reference storage block 555 in response to the power control signal PWR_CTRL indicating the power-off. Further, the diode sensing reference storage block 575 may store a diode sensing reference degradation amount DSRDA, and the diode degradation sensing comparator 580 may determine whether the diode sensing operation for each pixel block is to be performed by comparing the current accumulated block diode degradation information CABDDI with the diode sensing reference degradation amount DSRDA stored in the diode sensing reference storage block 575 in response to the power control signal PWR_CTRL indicating the power-off. In an embodiment, the transistor sensing reference degradation amount TSRDA and the diode sensing reference degradation amount DSRDA may be different from each other, and thus the transistor sensing operation and the diode sensing operation for each pixel block need not be performed in the same driving period, and may be performed in different driving periods.

In an embodiment, the transistor degradation sensing comparator 560 may generate a block transistor sensing enable signal BLK_TR_SEN_EN representing whether the transistor sensing operation for each respective pixel block is to be performed, and the sensing circuit 430 may selectively perform the transistor sensing operation for each respective pixel block in response to the block transistor sensing enable signal BLK_TR_SEN_EN. For example, as illustrated in FIG. 12, a sensing data voltage VSD may be applied through a data line DL to each pixel PX included in the pixel block for which the transistor sensing operation is determined to be performed, and a scan signal SC may be applied to the pixel PX. In this case, a driving transistor TDR may be turned on based on the sensing data voltage VSD, and a source voltage of the driving transistor TDR may be saturated to a voltage VSD-VTH where a threshold voltage VTH of the driving transistor TDR is subtracted from the sensing data voltage VSD. A sensing signal SS may be applied to the pixel PX, and the sensing circuit 430 may sense the threshold voltage VTH of the driving transistor TDR by measuring the saturated source voltage VSD-VTH of the driving transistor TDR through a sensing line SL. The threshold voltage VTH (or a degradation amount of the threshold voltage VTH) of the driving transistor TDR of each pixel PX sensed by this transistor sensing operation may be stored in the nonvolatile memory 460.

Further, in an embodiment, the diode degradation sensing comparator 580 may generate a block diode sensing enable signal BLK_D_SEN_EN representing whether the diode sensing operation for each respective pixel block is to be performed, and the sensing circuit 430 may selectively perform the diode sensing operation for each respective pixel block in response to the block diode sensing enable signal BLK_D_SEN_EN. For example, as illustrated in FIG. 13, an off voltage VOFF may be applied through the data line DL to each pixel PX included in the pixel block for which the diode sensing operation is determined to be performed, and the scan signal SC may be applied to the pixel PX. In this case, the driving transistor TDR may be turned off based on the off voltage VOFF. The sensing signal SS may be applied to the pixel PX, and the sensing circuit 430 may apply a reference voltage VREF to an anode of the organic light-emitting diode EL through the sensing line SL. Further, the sensing circuit 430 may sense a voltage (VREF) to current (IEL) characteristic of the organic light-emitting diode EL by measuring a current IEL of the organic light-emitting diode EL generated based on the reference voltage VREF. The voltage (VREF) to current (IEL) characteristic (or a degradation amount of the voltage (VREF) to current (IEL) characteristic) of the organic light-emitting diode EL of each pixel PX sensed by this diode sensing operation may be stored in the nonvolatile memory 460.

The transistor degradation sensing comparator 560 may reset the current accumulated block transistor degradation information CABTDI greater than or equal to the transistor sensing reference degradation amount TSRDA among the current accumulated block transistor degradation information CATBDI stored in the current transistor degradation storage block 550, and the diode degradation sensing comparator 580 may reset the current accumulated block diode degradation information CABDDI greater than or equal to the diode sensing reference degradation amount DSRDA among the current accumulated block diode degradation information CATDDI stored in the current diode degradation storage block 570. The current accumulated block transistor degradation information CABTDI, the current accumulated block diode degradation information CABDDI and the current final accumulated block degradation information CFABDI in the current driving period may be written to the nonvolatile memory 460 where they are used as the previous accumulated block transistor degradation information PABTDI, the previous accumulated block diode degradation information PABDDI and the previous final accumulated block degradation information PFABDI in the next driving period.

As described above, in the OLED display device 400 according to an embodiment, the current accumulated block transistor degradation information CABTDI for each of the plurality of pixel blocks may be calculated by adding the current block degradation information CBDI to the previous accumulated block transistor degradation information PABTDI, the current accumulated block diode degradation information CABDDI for each of the plurality of pixel blocks may be calculated by adding the current block degradation information CBDI to the previous accumulated block diode degradation information PABDDI, whether the transistor sensing operation for each of the plurality of pixel blocks is to be performed may be determined by comparing the current accumulated block transistor degradation information CABTDI for each of the plurality of pixel blocks with the transistor sensing reference degradation amount TSRDA, and whether the diode sensing operation for each of the plurality of pixel blocks is to be performed may be determined by comparing the current accumulated block diode degradation information CABDDI for each of the plurality of pixel blocks with the diode sensing reference degradation amount DSRDA. Accordingly, the transistor sensing operation for each of the plurality of pixel blocks may be selectively performed, the diode sensing operation for each of the plurality of pixel blocks may be selectively performed independently of the transistor sensing operation, and thus a sensing time in which the transistor sensing operation and/or the diode sensing operation are performed may be decreased compared with a case where the transistor sensing operation and the diode sensing operation are performed on the pixels PX of the entire display panel 410.

Figure 14:
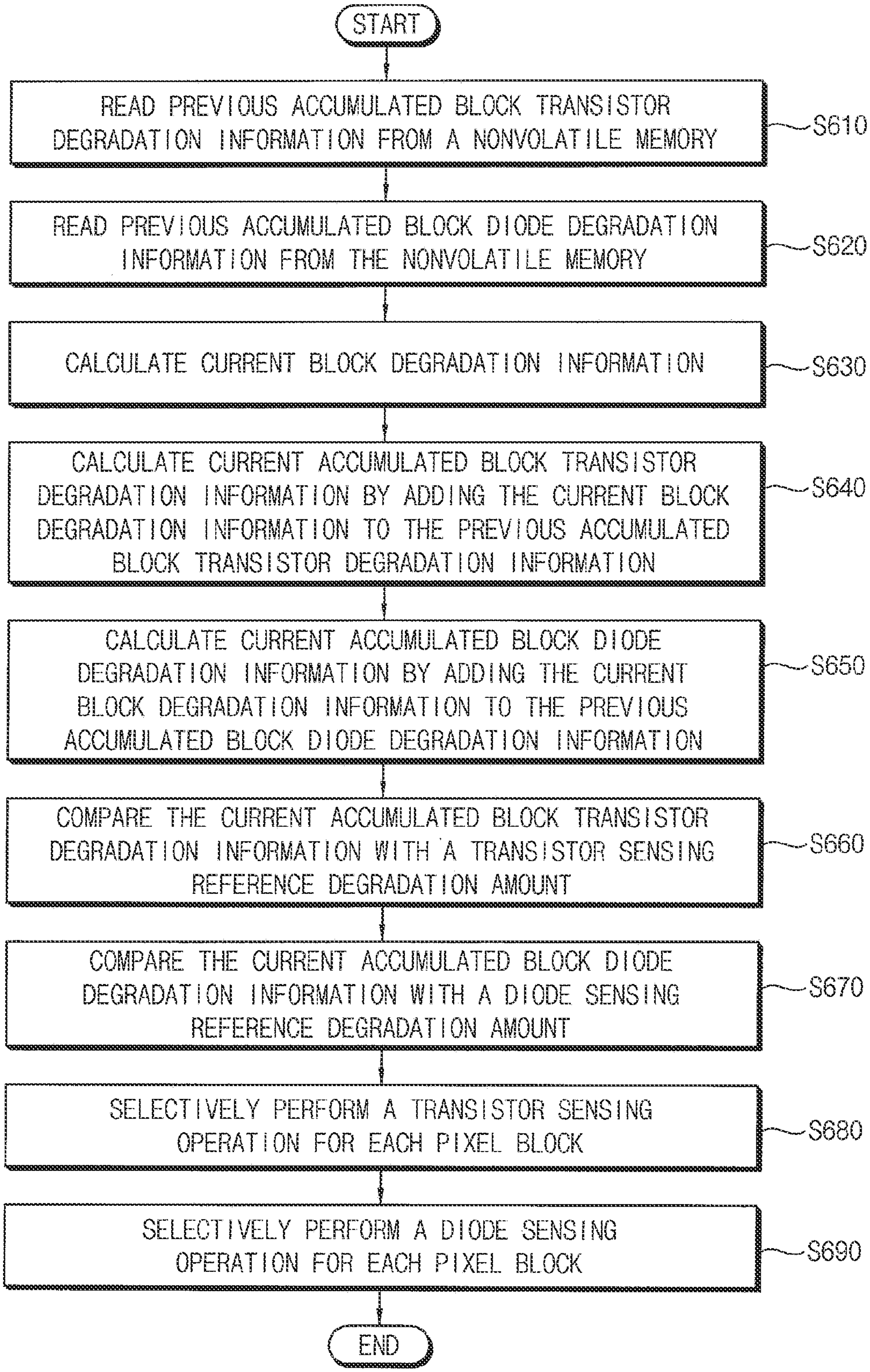
FIG. 14 is a flowchart illustrating a method of sensing degradation of an OLED display device according to an embodiment.

FIG. 14 is a flowchart illustrating a method of sensing degradation of an OLED display device according to an embodiment.

Referring to FIGS. 10, 11 and 14, in a method of sensing degradation of an OLED display device, an age manager 500 may read previous accumulated block transistor degradation information PABTDI representing accumulated block transistor degradation amounts for driving transistors of a plurality of pixels PX included in a plurality of pixel blocks from a nonvolatile memory 460 at function block S610, and may read previous accumulated block diode degradation information PABDDI representing accumulated block diode degradation amounts for organic light-emitting diodes of the plurality of pixels PX included in the plurality of pixel blocks from the nonvolatile memory 460 at function block S620. In an embodiment, the age manager 500 may further read previous final accumulated block degradation information PFABDI from the nonvolatile memory 460.

The age manager 500 may calculate current block degradation information CBDI in a current driving period at function block S630, may calculate current accumulated block transistor degradation information CABTDI for each of the plurality of pixel blocks by adding the current block degradation information CBDI to the previous accumulated block transistor degradation information PABTDI at function block S640, and may calculate current accumulated block diode degradation information CABDDI for each of the plurality of pixel blocks by adding the current block degradation information CBDI to the previous accumulated block diode degradation information PABDDI at function block S650. In an embodiment, the age manager 500 may further calculate current final accumulated block degradation information CFABDI by adding the current block degradation information CBDI to the previous final accumulated block degradation information PFABDI.

The age manager 500 may determine whether a transistor sensing operation for each of the plurality of pixel blocks is to be performed by comparing the current accumulated block transistor degradation information CABTDI with a transistor sensing reference degradation amount TSRDA at function block S660, and may determine whether a diode sensing operation for each of the plurality of pixel blocks is to be performed by comparing the current accumulated block diode degradation information CABDDI with a diode sensing reference degradation amount DSRDA at function block S670.

The sensing circuit 430 may receive a block transistor sensing enable signal BLK_TR_SEN_EN representing whether the transistor sensing operation for each respective pixel block is to be performed from the age manager 500, and may selectively perform the transistor sensing operation on the respective pixel block in response to the block transistor sensing enable signal BLK_TR_SEN_EN at function block S680. Further, the sensing circuit 430 may receive a block diode sensing enable signal BLK_D_SEN_EN representing whether the diode sensing operation for each respective pixel block is to be performed from the age manager 500, and may selectively perform the diode sensing operation on the respective pixel block in response to the block diode sensing enable signal BLK_D_SEN_EN at function block S690. Accordingly, a sensing time in which the transistor sensing operation and/or the diode sensing operation are performed may be decreased compared with a case where the transistor sensing operation and the diode sensing operation are performed on the pixels PX of the entire display panel 410.

Figure 15:
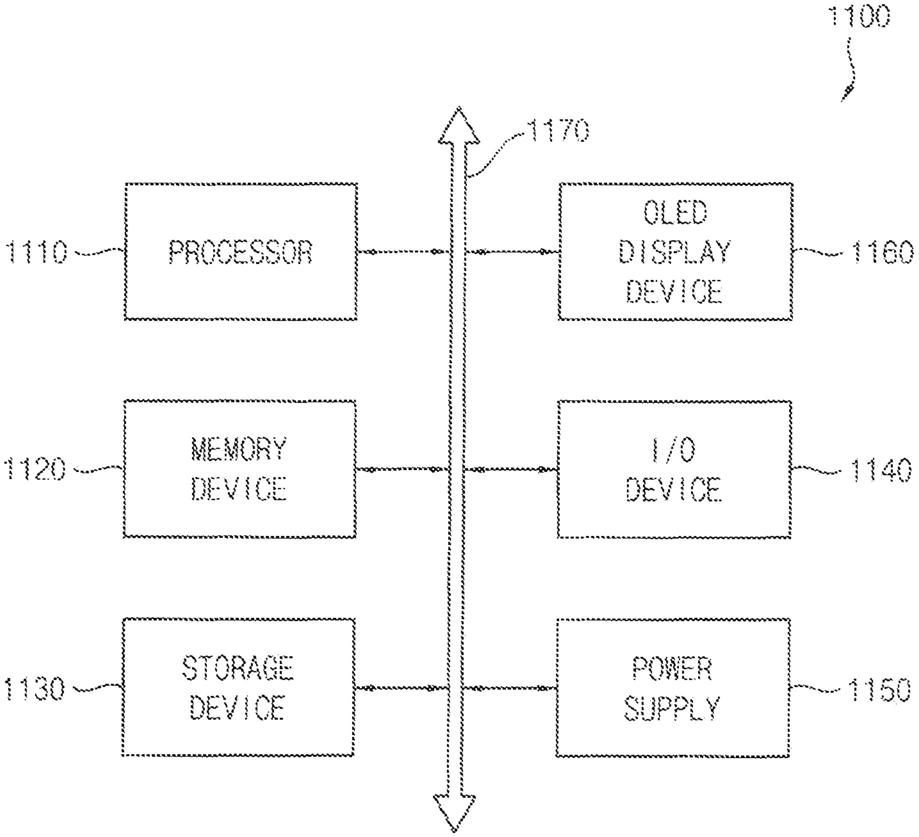
FIG. 15 is a block diagram illustrating an electronic device including an OLED display device according to an embodiment.

FIG. 15 illustrates an electronic device including an OLED display device according to an embodiment.

Referring to FIG. 15, an electronic device 1100 may include a processor 1110, a memory device 1120, a storage device 1130, an input/output (I/O) device 1140, a power supply 1150, an OLED display device 1160, and a communications bus 1170. The electronic device 1100 may further include a plurality of ports for communicating with a video card, a sound card, a memory card, a universal serial bus (USB) device, other electric devices, or the like.

The processor 1110 may perform various computing functions or tasks. The processor 1110 may be an application processor (AP), a micro-processor, a central processing unit (CPU), or the like. The processor 1110 may be coupled to other components via the communications bus 1170, an address bus, a control bus, a data bus, or the like. Further, in an embodiment, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like, and/or at least one volatile memory device such as a dynamic random access memory (DRAM) device, a static random access memory (SRAM) device, a mobile dynamic random access memory (mobile DRAM) device, or the like.

The storage device 1130 may be a solid-state drive (SSD) device, a hard disk drive (HDD) device, a compact disk read-only memory (CD-ROM) device, or the like. The I/O device 1140 may be an input device such as a keyboard, a keypad, a mouse, a touch screen, or the like, and an output device such as a display screen, a printer, a speaker, or the like. The power supply 1150 may supply power for operations of the electronic device 1100. The OLED display device 1160 may be coupled to other components through the buses or other communication links.

In the OLED display device 1160, current accumulated block degradation information for a plurality of pixel blocks may be calculated by adding current block degradation information to previous accumulated block degradation information, and whether a sensing operation for each of the plurality of pixel blocks is to be performed may be determined by comparing the current accumulated block degradation information for each of the plurality of pixel blocks with a sensing reference degradation amount. Accordingly, the sensing operation for each of the plurality of pixel blocks may be selectively performed, and thus a sensing time in which the sensing operation is performed may be decreased compared with a case where the sensing operation is performed on the pixels of the entire OLED display. In an embodiment, whether to perform a transistor sensing operation for each pixel block and/or a diode sensing operation for each pixel block may be determined independently of each other, and thus the sensing time in which the transistor sensing operation and/or the diode sensing operation are performed may be further decreased.

The inventive concepts disclosed herein may be applied to any electronic device 1100 including the OLED display device 1160, without limitation. For example, the inventive concepts may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, and the like.

The foregoing is illustrative of embodiments and is not to be construed as limiting thereof. Although some embodiments have been described, those of ordinary skill in the pertinent art will readily appreciate that many modifications are possible without materially departing from the teachings of the present disclosure. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including pixels, the pixels being grouped into pixel blocks;

a memory configured to store first accumulated degradation information for each of the pixel blocks up to a first driving period;

a controller configured to obtain degradation information for each of the pixel blocks in a second driving period, obtain second accumulated degradation information for each of the pixel blocks up to the second driving period based on the degradation information and the first accumulated degradation information in response to a power control signal indicating a power-off, and determine in parallel whether a transistor sensing operation is to be performed and whether a diode sensing operation is to be performed for a respective pixel block of the pixel blocks based on the second accumulated degradation information; and a sensing circuit configured to selectively perform the determined transistor sensing operation and the determined diode sensing operation for the respective pixel block, wherein the first accumulated degradation information for the respective pixel block on which the determined transistor sensing operation and the determined diode sensing operation are selectively performed indicates an initial degradation amount in a third driving period.

2. The display device of claim 1, wherein the controller divides input image data into block image data for the pixel blocks, and calculates the degradation information for the pixel blocks in the second driving period by accumulating the block image data in each of frame periods.

3. The display device of claim 2, wherein the controller calculates the degradation information in the second driving period by applying to the block image data at least one of block position weights determined according to positions of the pixel blocks, driving frequency weights determined according to driving frequencies of the pixel blocks, emission duty weights determined according to emission duties of the pixel blocks, or a global current modulation compensation value for the display panel.

4. The display device of claim 1, wherein the controller reads the first accumulated degradation information from the memory in response to the power control signal indicating a power-on.

5. The display device of claim 1, wherein the controller writes the second accumulated degradation information to the memory in response to the power control signal indicating the power-off where the second accumulated degradation information in the second driving period is used as the first accumulated degradation information in the third driving period.

6. The display device of claim 1, wherein the controller determines that the sensing operation for a pixel block of the pixel blocks is not to be performed in a first case where the second accumulated degradation information for the pixel block is less than a reference degradation amount, and determines that the sensing operation for the pixel block is to be performed in a second case where the second accumulated degradation information for the pixel block is greater than or equal to the reference degradation amount, wherein the sensing operation for each of the pixel blocks includes a diode sensing operation for each of the pixel blocks based on the second accumulated degradation information, wherein the controller resets the second accumulated degradation information for the pixel block for which the sensing operation is determined to be performed to an initial degradation amount.

7. The display device of claim 1, wherein the memory further stores first final accumulated degradation information for the pixel blocks from an initial driving period up to the first driving period, and wherein the controller calculates second final accumulated degradation information for the pixel blocks from the initial driving period up to the second driving period by adding the degradation information to the first final accumulated degradation information in response to the power control signal indicating the power-off.

8. The display device of claim 1, wherein the controller includes an age manager configured to determine whether the sensing operation for each of the pixel blocks is to be performed, and wherein the age manager includes:

a first storage circuit configured to store the first accumulated degradation information read from the memory;

a second storage circuit configured to store first final accumulated degradation information read from the memory;

a calculation circuit configured to calculate the degradation information in the second driving period;

a first addition circuit configured to calculate the second accumulated degradation information by adding the degradation information to the first accumulated degradation information;

a second addition circuit configured to calculate second final accumulated degradation information by adding the degradation information to the first final accumulated degradation information;

a third storage circuit configured to store the second accumulated degradation information;

a fourth storage circuit configured to store the second final accumulated degradation information;

a fifth storage circuit configured to store a reference degradation amount; and a degradation sensing comparator configured to compare the second accumulated degradation information with the reference degradation amount to determine whether the sensing operation for each of the pixel blocks is to be performed, and to reset the second accumulated degradation information that is stored in the third storage circuit and is greater than or equal to the reference degradation amount.

9. The display device of claim 1, wherein the sensing operation for each of the pixel blocks includes a transistor sensing operation for driving transistors of the pixels included in each of the pixel blocks, and a diode sensing operation for light-emitting diodes of the pixels included in each of the pixel blocks, wherein the first accumulated degradation information includes first accumulated transistor degradation information for driving transistors of the pixels included in the pixel blocks, and first accumulated diode degradation information for light-emitting diodes of the pixels included in the pixel blocks, wherein the controller calculates second accumulated transistor degradation information for the pixel blocks by adding the degradation information to the first accumulated transistor degradation information in response to the power control signal indicating the power-off, and calculates second accumulated diode degradation information for the pixel blocks by adding the degradation information to the first accumulated diode degradation information in response to the power control signal indicating the power-off.

10. The display device of claim 9, wherein the sensing operation includes a transistor sensing operation and a diode sensing operation, and wherein the controller determines whether the transistor sensing operation for each of the pixel blocks is to be performed by comparing the second accumulated transistor degradation information with a transistor reference degradation amount, and determines whether the diode sensing operation for each of the pixel blocks is to be performed by comparing the second accumulated diode degradation information with a diode reference degradation amount.

11. The display device of claim 10, wherein the controller includes an age manager configured to determine whether the transistor sensing operation for each of the pixel blocks is to be performed and whether the diode sensing operation for each of the pixel blocks is to be performed, and wherein the age manager includes:

a first storage circuit configured to store the first accumulated transistor degradation information read from the memory;

a second storage circuit configured to store the first accumulated diode degradation information read from the memory;

a third storage circuit configured to store first final accumulated degradation information read from the memory;

a calculation circuit configured to calculate the degradation information in the second driving period;

a first addition circuit configured to calculate the second accumulated transistor degradation information by adding the degradation information to the first accumulated transistor degradation information;

a second addition circuit configured to calculate the second accumulated diode degradation information by adding the degradation information to the first accumulated diode degradation information;

a third addition circuit configured to calculate second final accumulated degradation information by adding the degradation information to the first final accumulated degradation information;

a fourth storage circuit configured to store the second accumulated transistor degradation information;

a fifth storage circuit configured to store the second accumulated diode degradation information;

a sixth storage circuit configured to store the second final accumulated degradation information;

a seventh storage circuit configured to store the transistor reference degradation amount;

an eighth storage circuit configured to store the diode reference degradation amount;

a transistor degradation sensing comparator configured to compare the second accumulated transistor degradation information with the transistor reference degradation amount to determine whether the transistor sensing operation for each of the pixel blocks is to be performed, and to reset the second accumulated transistor degradation information that is stored in the fourth storage circuit and is greater than or equal to the transistor reference degradation amount; and a diode degradation sensing comparator configured to compare the second accumulated diode degradation information with the diode reference degradation amount to determine whether the diode sensing operation for each of the pixel blocks is to be performed, and to reset the second accumulated diode degradation information that is stored in the fifth storage circuit and is greater than or equal to the diode reference degradation amount.

12. A display device comprising:

a display panel including pixels, the pixels being grouped into pixel blocks;

a memory configured to store first accumulated degradation information for each of the pixel blocks up to a first driving period;

a controller configured to obtain degradation information for each of the pixel blocks in a second driving period, and to obtain second accumulated degradation information for each of the pixel blocks up to the second driving period based on the degradation information and the first accumulated degradation information in response to a power control signal indicating a power-off; and a sensing circuit configured to selectively perform a sensing operation for each of the pixel blocks based on the second accumulated degradation information, wherein the first accumulated degradation information for a pixel block on which the sensing operation is performed indicates an initial degradation amount in a third driving period, wherein the first accumulated degradation information for each of the pixel blocks up to the first driving period includes first accumulated transistor degradation information for the pixel blocks up to the first driving period, first accumulated diode degradation information for the pixel blocks up to the first driving period, and first final accumulated degradation information for the pixel blocks from an initial driving period up to the first driving period, wherein the second accumulated degradation information for each of the pixel blocks up to the second driving period includes second accumulated transistor degradation information for the pixel blocks, second accumulated diode degradation information for the pixel blocks, and second final accumulated degradation information for the pixel blocks, wherein the sensing operation for each of the pixel blocks includes a transistor sensing operation for each of the pixel blocks based on the second accumulated transistor degradation information, and a diode sensing operation for each of the pixel blocks based on the second accumulated diode degradation information.

13. The display device of claim 12, wherein the controller includes an age manager configured to determine whether the transistor sensing operation for each of the pixel blocks is to be performed and whether the diode sensing operation for each of the pixel blocks is to be performed, and wherein the age manager includes:

a first storage circuit configured to store the first accumulated transistor degradation information read from the memory;

a second storage circuit configured to store the first accumulated diode degradation information read from the memory;

a third storage circuit configured to store the first final accumulated degradation information read from the memory;

a calculation circuit configured to calculate the degradation information in the second driving period;

a first addition circuit configured to calculate the second accumulated transistor degradation information by adding the degradation information to the first accumulated transistor degradation information;

a second addition circuit configured to calculate the second accumulated diode degradation information by adding the degradation information to the first accumulated diode degradation information;

a third addition circuit configured to calculate the second final accumulated degradation information by adding the degradation information to the first final accumulated degradation information;

a fourth storage circuit configured to store the second accumulated transistor degradation information;

a fifth storage circuit configured to store the second accumulated diode degradation information;

a sixth storage circuit configured to store the second final accumulated degradation information;

a seventh storage circuit configured to store a transistor reference degradation amount;

an eighth storage circuit configured to store a diode reference degradation amount;

a transistor degradation sensing comparator configured to compare the second accumulated transistor degradation information with the transistor reference degradation amount to determine whether the transistor sensing operation for each of the pixel blocks is to be performed, and to reset the second accumulated transistor degradation information that is stored in the fourth storage circuit and is greater than or equal to the transistor reference degradation amount; and a diode degradation sensing comparator configured to compare the second accumulated diode degradation information with the diode reference degradation amount to determine whether the diode sensing operation for each of the pixel blocks is to be performed, and to reset the second accumulated diode degradation information that is stored in the fifth storage circuit and is greater than or equal to the diode reference degradation amount.

14. A method of sensing degradation of a display device, the method comprising:

reading first accumulated degradation information for pixel blocks up to a first driving period from a memory included in the display device;

obtaining degradation information for the pixel blocks in a second driving period;

obtaining second accumulated degradation information for the pixel blocks up to the second driving period based on the degradation information and the first accumulated degradation information in response to a power control signal indicating a power-off; and for each respective pixel block of the pixel blocks, determining whether to perform a sensing operation for said respective pixel block including determining in parallel whether to perform a diode sensing operation and whether to perform a transistor sensing operation based on the second accumulated degradation information; and selectively performing the determined sensing operation for said respective pixel block, wherein said determining comprises:

determining to selectively perform the diode sensing operation for at least one second pixel block of the pixel blocks; and determining to selectively perform the transistor sensing operation for at least one third pixel block of the pixel blocks.

15. The method of claim 14, further comprising:

reading first final accumulated degradation information for the pixel blocks from an initial driving period up to the first driving period from the memory; and calculating second final accumulated degradation information for the pixel blocks from the initial driving period up to the second driving period by adding the degradation information to the first final accumulated degradation information in response to the power control signal indicating the power-off, wherein determining whether the sensing operation for each of the pixel blocks is to be performed includes:

determining that the sensing operation for a pixel block of the pixel blocks is not to be performed in a first case where the second accumulated degradation information for the pixel block is less than a reference degradation amount;

determining that the sensing operation for the pixel block is to be performed in a second case where the second accumulated degradation information for the pixel block is greater than or equal to the reference degradation amount; and resetting the second accumulated degradation information for the pixel block for which the sensing operation is determined to be performed to an initial degradation amount.

16. The method of claim 14, wherein reading the first accumulated degradation information from the memory includes:

reading first accumulated transistor degradation information for driving transistors of pixels included in the pixel blocks from the memory; and reading first accumulated diode degradation information for light-emitting diodes of the pixels included in the pixel blocks from the memory, wherein calculating the second accumulated degradation information includes:

calculating second accumulated transistor degradation information for the pixel blocks by adding the degradation information to the first accumulated transistor degradation information; and calculating second accumulated diode degradation information for the pixel blocks by adding the degradation information to the first accumulated diode degradation information, and wherein determining whether the sensing operation for each of the pixel blocks is to be performed includes:

determining whether a transistor sensing operation for each of the pixel blocks is to be performed by comparing the second accumulated transistor degradation information with a transistor reference degradation amount; and determining whether a diode sensing operation for each of the pixel blocks is to be performed by comparing the second accumulated diode degradation information with a diode reference degradation amount.

17. The method of claim 14, wherein said determining comprises:

determining to selectively perform neither the diode sensing operation nor the transistor sensing operation for at least one first pixel block of the pixel blocks; and determining to selectively perform both the diode sensing operation and the transistor sensing operation for at least one fourth pixel block of the pixel blocks.

18. The display device of claim 1, wherein the controller and the sensing circuit are configured to selectively perform the transistor sensing operation for at least one third pixel block of the pixel blocks, wherein the controller and the sensing circuit are configured to selectively perform the diode sensing operation for at least one second pixel block of the pixel blocks.

19. The display device of claim 1, wherein the controller and the sensing circuit are configured to selectively perform both the transistor sensing operation and the diode sensing operation for at least one fourth pixel block of the pixel blocks, wherein the controller and the sensing circuit are configured to selectively perform neither the transistor sensing operation nor the diode sensing operation for at least one first pixel block of the pixel blocks.

20. The method of claim 14, wherein said determining comprises:

determining not to selectively perform the diode sensing operation nor the transistor sensing operation for at least one fourth pixel block of the pixel blocks.

* * * * *